(12) United States Patent
Hattori et al.

(10) Patent No.: US 7,932,318 B2
(45) Date of Patent: Apr. 26, 2011

(54) CONDUCTIVE ROLLER COMPOSITION OF CHLOROPRENE RUBBER, EPICHLOROHYDRIN-ETHYLENE OXIDE COPOLYMER AND THIOUREA

(75) Inventors: Takayuki Hattori, Kobe (JP); Tetsuo Mizoguchi, Kobe (JP); Shunichi Yabushita, Kobe (JP); Kenichi Uesaka, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 12/659,077

(22) Filed: Feb. 24, 2010

(65) Prior Publication Data

US 2010/0222483 A1 Sep. 2, 2010

Related U.S. Application Data

(62) Division of application No. 12/216,588, filed on Jul. 8, 2008, which is a division of application No. 11/153,436, filed on Jun. 16, 2005, now abandoned, which is a division of application No. 10/225,178, filed on Aug. 22, 2002, now abandoned.

(30) Foreign Application Priority Data

Aug. 23, 2001 (JP) .................................. 2001-252452
Dec. 25, 2001 (JP) .................................. 2001-391404
Jan. 24, 2002 (JP) .................................. 2002-016047

(51) Int. Cl.
*C08L 23/08* (2006.01)
*C08L 27/04* (2006.01)
*C08L 71/03* (2006.01)
*G03G 15/06* (2006.01)
*H01B 1/12* (2006.01)

(52) U.S. Cl. ........ 524/556; 252/511; 399/279; 524/567; 524/612

(58) Field of Classification Search .................. None
See application file for complete search history.

(56) References Cited

U.S. PATENT DOCUMENTS

| | | | | |
|---|---|---|---|---|
| 3,459,694 A | * | 8/1969 | Bowman | ........................ 524/114 |
| 3,708,461 A | | 1/1973 | Karastu et al. | |
| 4,558,102 A | | 12/1985 | Miyata | |
| 4,594,396 A | | 6/1986 | Berta | |
| 5,804,309 A | | 9/1998 | Itoh et al. | |
| 6,458,883 B1 | | 10/2002 | Takashima et al. | |
| 6,500,884 B1 | | 12/2002 | Tsujimura et al. | |
| 6,558,781 B1 | * | 5/2003 | Fuei et al. | ........................ 428/212 |
| 7,098,264 B2 | | 8/2006 | Mizumoto et al. | |
| 2002/0022142 A1 | | 2/2002 | Harada | |
| 2003/0083411 A1 | * | 5/2003 | Sugiura et al. | .................. 524/260 |

FOREIGN PATENT DOCUMENTS

| | | |
|---|---|---|
| EP | 1 170 331 A1 | 1/2000 |
| JP | 1-142569 | 11/1987 |
| JP | 06-208289 | 1/1993 |
| JP | 06-242667 | 2/1993 |
| JP | 6-257615 | 3/1993 |
| JP | 10-087893 | 9/1996 |
| JP | 10-186799 | 12/1996 |
| JP | 11-231616 | 2/1998 |
| JP | 2000-063656 | 8/1998 |
| JP | 2000-212330 | 1/1999 |
| JP | 2001-207050 | 1/2000 |
| JP | 2000-63656 A * | 2/2000 |

OTHER PUBLICATIONS

Chemical abstracts accession No. 2000: 182523, Farid, "Effects of various acid acceptors upon stress relaxation and set in epichlorohydrin elastomers", Plastics Rubber and Composites, vol. 28, No. 10, 1999, abstract.
Chemical abstracts registry No. 1314-13-2 for zinc oxide, 1967.

* cited by examiner

Primary Examiner — Robert Sellers
(74) Attorney, Agent, or Firm — Stites & Harbison PLLC; Juan Carlos A. Marquez, Esq.

(57) ABSTRACT

A polymer composition for a conductive roller composed of a rubber component whose main component is an epichlorohydrin rubber containing ethylene oxide at not less than 55 mol % nor more than 95 mol %. Thioureas are added to 100 g of the rubber component as a crosslinking agent at a rate not less than 0.014 mol nor more than 0.080 mol. In a compression set test of a vulcanized rubber described in JIS K6262, a compression set measured at 70° C. for 22-24 hours is less than 15%; and in a volume resistivity value test described in JIS K6911, a volume resistivity value measured at an applied voltage of 1000V is less than $10^{7.5}[\Omega \cdot cm]$.

1 Claim, 7 Drawing Sheets

CONDUCTIVE ROLLER COMPOSITION OF CHLOROPRENE RUBBER, EPICHLOROHYDRIN-ETHYLENE OXIDE COPOLYMER AND THIOUREA

CROSS-REFERENCES TO RELATED APPLICATIONS

This application is a Divisional application of U.S. application Ser. No. 12/216,588 filed Jul. 8, 2008, which is a Divisional Application of U.S. application Ser. No. 11/153,436 filed Jun. 16, 2005 now abandoned, which is a Divisional Application of U.S. application Ser. No. 10/225,178 filed Aug. 22, 2002 now abandoned. Priority is claimed based on U.S. application Ser. No. 12/216,588 filed Jul. 8, 2008, which claims priority to U.S. application Ser. No. 11/153,436 filed Jun. 16, 2005, which claims priority to U.S. application Ser. No. 10/225,178 filed Aug. 22, 2002, which claims priority to Japanese Patent Application Nos. 2002-016047, 2001-391404, and 2001-252452, filed Jan. 24, 2002, Dec. 25, 2001 and Aug. 23, 2001, respectively, all of which is incorporated by reference.

BACKGROUND OF THE INVENTION

1. Field of the Invention

The present invention relates to a polymer composition for a conductive roller, a polymer composition, a conductive roller, and a conductive belt. More particularly, the conductive roller and the conductive belt are used for a conductive mechanism of an electrophotographic device of office appliances such as a copying machine, a printer, and the like. The polymer composition can be used effectively for conductive rollers, having a low electric resistance value, such as a developing roller, a charging roller, and a transfer roller for a color copying machine and a color printer. The present invention also relates to improvement of the state of the polymer composition when it is foamed to form the conductive roller such as the transfer roller, the developing roller, the charging roller, and a toner supply roller thereof and productivity of the conductive roller.

2. Description of the Related Art

It is necessary to impart an appropriate stable electric resistance value to the developing roller, the charging roller, and the transfer roller for use in the color copying machine and the color printer. To impart conductivity to the roller of this kind, the following two methods are conventionally used: Used in one of them is an electroconductive polymer composition containing a conductive filler such as powder of metal oxide and carbon black in a polymer thereof. Used in the other of them is an ionic-conductive polymer such as urethane rubber, acrylonitrile butadiene rubber (NBR), and epichlorohydrin rubber.

In the case where the electroconductive polymer composition is used, there is a region in which an electric resistance changes rapidly owing to a slight change of the addition amount of a conductive filler. Thus it is very difficult to control the electric resistance. In addition, because it is difficult for the conductive filler to disperse uniformly in the polymer composition, an electric resistance value has variations in the circumferential and widthwise directions of the roller.

The electric resistance value of the conductive roller composed of the electroconductive polymer composition containing the conductive filler depends on an applied voltage and does not have a constant electric resistance value. In particular, in the case where the carbon black is used as the conductive filler, there is no stable correlation between the addition amount of the carbon black and the volume resistivity of the polymer. Moreover as described above, there is the region in which the electric resistance changes rapidly owing to a slight change of the addition amount of the conductive filler. Therefore these tendencies appear outstandingly.

The conductive roller composed of the electroconductive polymer has variations in its electric resistance value, as described above. Thus as the recent tendency, a roller composed of the ionic-conductive polymer is used more than a roller composed of the electroconductive polymer in a copying machine and a printer required to have a high image quality by using digital image processing technique and color image processing technique and save energy.

However, it is difficult to lower the electric resistance value of the ionic-conductive polymer composition. Thus the ionic-conductive polymer composition having a volume resistivity value less than $10^{8.0}$ [Ω·cm] has not been realized in the mode in which it can be put into practical use.

More specifically, the volume resistivity value of urethane is more than $10^{8.5}$ [Ω·cm] in the case where no additive is added thereto. Attempts of increasing the ionization degree by adding various metal ion salts or a quaternary ammonium salt to the polymer composition are made to realize a lower electric resistance. However it is difficult to obtain a volume resistivity value lower than $10^{7.8}$ or $10^{7.9}$. The additive for increasing the ionic conductivity may stain the photosensitive member. Further in a system in which the electric resistance is dropped by the additive, the electric resistance rise much at the time of a continuous energization.

The acrylonitrile-butadiene rubber (NBR) has favorable mechanical properties such as the compression set. However, the electric resistance of the acrylonitrile-butadiene rubber is more than $10^{9.5}$ [Ω·cm] and thus higher than that of the urethane. Even though an additive for increasing the ionic conductivity is used, it is impossible to make the electric resistance value of the acrylonitrile-butadiene rubber lower than $10^{8.0}$ [Ω·cm].

Regarding the epichlorohydrin rubber in a system in which the photosensitive member is not stained, the electric resistance value of the—epichlorohydrin rubber is not less than $10^{8.0}$ [Ω·cm] which is a little lower than that of urethane. However, in the system in which the electric resistance is dropped by the additive, the electric resistance rise much at the time of the continuous energization, as in the case of the urethane.

Regarding the electric resistance value of the epichlorohydrin rubber, it is known that there is a close correlation between the copolymerization ratio of ethylene oxide (may be hereinafter referred to as EO) and the electric resistance thereof in GECO (ethylene oxide-epichlorohydrin (may be hereinafter referred to as EP)-allyl glycidyl ether (may be hereinafter referred to as (AGE)) copolymer) and ECO (ethylene oxide-epichlorohydrin copolymer).

In the proposal disclosed in Japanese Patent Application Laid-Open No. 2000-63656, the copolymerization ratio of the EO is increased to reduce the electric resistance value. More specifically, an epichlorohydrin rubber composition is allowed to have a low electric resistance of $10^{6.9}$ [Ω·cm] in a sulfur crosslinking system by the increase of the copolymerization ratio of the EO.

Representative vulcanizing systems for the epichlorohydrin rubber are a sulfur vulcanizing system, a vulcanizing system using a triazine derivative, a peroxide vulcanizing system, a vulcanizing system using a derivative of 2,3 dimethyl quinoxaline, and a vulcanizing system using thiourea.

It is conceivable to reduce the electric resistance value and the extent of stain of the photosensitive member in the sulfur vulcanizing system. However, the electric resistance will increase and the compression set will deteriorate. In the peroxide vulcanizing system, the photosensitive member is allowed to have a low degree of staining by carrying out secondary vulcanization. In this case, the electric resistance value rises. Thus, the use of the peroxide vulcanizing system is unpractical. The vulcanizing system using the derivative of 2,3 dimethyl quinoxaline has an advantage of outstandingly reducing the compression set but stains the photosensitive member much and modifies members on the periphery thereof. Thus the vulcanizing system using the derivative of the 2,3 dimethyl quinoxaline is not of practical use.

The vulcanizing system using the thiourea is capable of realizing a low electric resistance, a low compression set, and a low extent of staining of the photosensitive member, unlike the other vulcanizing systems. Therefore many vulcanizing systems use the thiourea. But in the vulcanizing system using the thiourea, lead oxide such as trilead tetraoxide is used as a acid accepting agent and an activator in a crosslinking reaction.

As the vulcanizing system using the thiourea, a semi-conductive rubber material containing the epichlorohydrin rubber and 2-mercaptoimidazoline is disclosed in Japanese Patent Application Laid-Open No. 6-242667.

In the case where a polymer composition such as rubber is used to form a charging roller, a developing roller, a toner supply roller, a transfer roller, and a transfer belt for use in a copying machine and a printer, there are proposed an organic peroxide-containing system, a thioureas-containing system, crosslinking (vulcanizing) systems such as a sulfur crosslinking (vulcanizing) system in consideration of a high productivity and various properties necessary for rollers. For example, the sulfur vulcanizing system is used because it provides a high vulcanizing speed and preferable property.

More specifically, in Japanese Patent Application Laid-Open No. 2000-212330, there is disclosed a vulcanized rubber composition containing a mixture of nitrile rubber and epichlorohydrin rubber and two or more vulcanizing agents selected from a group of a sulfur vulcanizing agent, a triazine compound, and a 2,3-dimelcaptoquinoxaline compound added thereto.

Disclosed in U.S. Pat. No. 3,121,163 is a conductive roller having a resistance-adjusting layer containing the epichlorohydrin rubber, a specific age resistor, and 2-melcaptoimidazoline (ethylene thiourea).

In order for the conductive roller to display a sufficient function, it is necessary to make a nip width large to some extent. To do so, a plasticizer such as dibutyl phthalate (DBP), dioctyl phthalate (DOP) or tricresil phosphate is added to a rubber composition for a conductive roller or a foaming agent is used together with a urea assistant foaming agent to foam the rubber composition and make its hardness very low.

However, in the epichlorohydrin rubber composition having a low electric resistance value in the sulfur vulcanizing system disclosed in Japanese Patent Application Laid-Open No. 2000-63656, merely the prescription of the general-purpose sulfur and the vulcanizing accelerator is utilized. Therefore it is difficult to use the epichlorohydrin rubber composition for a charging roller or a developing roller which contacts the photosensitive member directly. Further since the epichlorohydrin rubber composition has a high compression set, there occurs problems in the durability and precision maintenance of an image-forming process system including the roller.

Disclosed in Japanese Patent Application Laid-Open No. 6-242667 is the semi-conductive rubber material to be vulcanized by the thiourea serving as the vulcanizing agent. In the semi-conductive rubber material, the content of the EO of the epichlorohydrin rubber is as small as 41% and that of the mercaptoimidazoline is as small as 1.2 phr (0.0118 mol for 100 g of polymer). Thus the semi-conductive rubber material has a high electric resistance value and stains the photosensitive member much.

It is conceivable to use the ethylene thiourea and hydrotalcite as the vulcanizing system using the thiourea. However, the use of the ethylene thiourea and the hydrotalcite does not have a sufficient crosslinking efficiency. Thus the rubber composition stains the photosensitive member and does not have a low compression set. Therefore the rubber composition is not of practical use.

Accordingly used currently are a carbon-containing electroconductive polymer composition and urethane rubber or epichlorohydrin rubber to which electroconductivity is imparted by carbon in the range in which ionic conductivity is not deteriorated. However, in a product and among products, the system using the ionic-conductive polymer composition and the electroconductive polymer composition in combination has a larger variation in the electric resistance than the ionic-conductive polymer composition. Further the former depends on a voltage to a much higher extent than the latter. Furthermore the former has problems in preventing the photosensitive member from being stained and realizing a low compression set. The system using the ionic-conductive polymer composition and the electroconductive polymer composition in combination has not been realized in the mode in which it can be put into practical use.

The present invention has been made in view of the above-described problems. Therefore it is a first object of the present invention to provide a high-performance polymer composition having a low volume resistivity value and a low compression set and not staining a photosensitive member. It is also a first object to provide a conductive roller composed of the polymer composition and not polluting environment and having a high operability. The conductive roller includes a developing roller, a charging roller, and a transfer roller for use in a color copying machine and a color printer.

In the vulcanized rubber composition disclosed in Japanese Patent Application Laid-Open No. 2000-212330, the nitrile rubber (NBR) and the epichlorohydrin rubber not having chlorine in molecules thereof are mixed with each other at the weight ratio of 20/80-80/20. Thus the crosslinking density of the NBR that is crosslinked with only sulfur and sulfur-vulcanizing accelerator becomes low, and the photosensitive member is stained. This is because the sulfur and the sulfur-vulcanizing accelerator are also distributed to and consumed by the epichlorohydrin rubber. Blooming may occur if the amount of the sulfur and that of the sulfur-vulcanizing accelerator are increased to prevent this. If the crosslinking density increases unnecessarily to prevent the photosensitive member from being stained, the electric resistance value will become higher. Further if a can vulcanization is made when the amount of a filler is small in the vulcanizing system using only sulfur, it may be necessary to set a mixture of components in a receiving die before vulcanization is made in consideration of a heat-caused deformation thereof. Thus the manufacturing cost is high owing to the labor of setting the mixture in the receiving die and equipment expense and the productivity will be low.

In the crosslinking system not using sulfur and using only the thiourea disclosed in U.S. Pat. No. 3,121,163, a crosslinking reaction is slow. Thus the productivity is low. If the amount of the thioureas or the accelerator is increased much to enhance productivity, blooming or the stain of the photosensitive member may occur. Depending on a case, rubber may be burnt in a kneader or an extruder.

The present invention has been made in view of the above-described problems. Therefore it is a second object of the present invention to provide a polymer composition allowing a crosslinking speed to be high while preventing a photosensitive member from being stained and allowing reduction of a compression set. It is also a second object of the present invention provide a conductive roller and a conductive belt excellent in various properties and productivity.

In the case where the plasticizer is used, as described above to make the nip width large, the plasticizer moves to the surface of the roller and stains the photosensitive member. In the case where the polymer composition is foamed by using a urea assistant foaming agent, inhibition of vulcanization will occur. Consequently the vulcanizing speed will decrease, the productivity will be low, the strength of the foamed polymer composition will be low, and the photosensitive member may be stained in dependence on a case.

In the case where the foaming agent is used, vulcanization is performed mainly by sulfur. In this case, a scorch time takes long even though the urea assistant foaming agent is not used and inhibition of vulcanization occurs. In the case where can vulcanization (vulcanizer) is performed by using pressurized water vapor, a foamed tube will get out of shape, the inner and outer surfaces of the foamed tube will be rough, and the foamed tube will warp in its longitudinal direction. Thus the obtained foamed tube is not preferable or defective.

The present invention has been made in view of the above-described problems. Therefore it is a third object of the present invention to provide a polymer composition allowing a vulcanizing speed to be high while preventing generation of blooming, reduction of a compression set to be accomplished, not having the problem of inhibition of vulcanization, having a high strength and a preferable surface when the polymer composition is foamed, and being superior in productivity. It is also a third object of the present invention to provide a conductive roller composed of the polymer composition.

It is a fourth object of the present invention to provide a polymer composition not polluting environment and having a high operability and a conductive roller composed of the polymer composition.

SUMMARY OF THE INVENTION

To achieve the first object, according to the first invention, there is provided a polymer composition for a conductive roller composed of a rubber component whose main component is epichlorohydrin rubber containing ethylene oxide not less than 55 mol % nor more than 95 mol %. In a permanent strain test of vulcanized rubber described in JIS K6262, a compression set measured at a temperature of 70° C. for 22-24 hours is less than 15%; and in a volume resistivity value test described in JIS K6911, a volume resistivity value measured at an applied voltage of 1000V is less than $10^{7.5}$ [Ω·cm].

The polymer composition for the conductive roller of the first invention contains the rubber component whose main component is the epichlorohydrin rubber containing the specified amount of the ethylene oxide. Therefore it is possible to prevent occurrence of bleeding and stain of a photosensitive member. It is also possible to reduce the volume resistivity value and compression set of the polymer composition. Since the value of the volume resistivity and that of the compression set are specified to the above range respectively, the polymer composition can be very favorably used to compose the conductive roller.

To achieve the second object, the present invention provides a polymer composition containing a polymer having a carbon-to-carbon double bond and a halogen as its main component and sulfur and thioureas.

As described above, the polymer composition of the second present invention contains the polymer having the carbon-to-carbon double bond and the halogen as its main component, the sulfur, and the thioureas. Thus the sulfur and the thioureas are capable of operating independently in a separate reaction mechanism without interfering with each other. Therefore the crosslinking system of the thioureas accomplishes a low compression set. In addition, the crosslinking system of the sulfur makes a crosslinking speed high. Thus it is possible to improve productivity. Further by using the sulfur and the thioureas in combination, it is also possible to accomplish reduction of the compression set and improvement of the crosslinking speed efficiently, while suppressing occurrence of blooming and stain of a photosensitive member.

To achieve the third object, the third invention provides a polymer composition for a conductive roller containing a carbon-to-carbon double bond and a halogen as its main component, a chemical foaming agent, sulfur, and thioureas.

As described above, the polymer composition of the third present invention contains the carbon-to-carbon double bond and the halogen as its main component, the chemical foaming agent, the sulfur, and the thioureas. Thus the sulfur and the thioureas are capable of operating independently in a separate reaction mechanism without interfering with each other. Therefore the vulcanizing system of the thioureas achieves a low compression set. In addition, the vulcanizing system of the sulfur makes a vulcanization speed high. Thus it is possible to improve productivity. In addition, there is no problem in inhibition of vulcanization, obtain a, preferable foamed state, and enlarge a nip width.

That is, in the third invention, by using the chemical foaming agent, the sulfur, and the thioureas in combination, it is possible to reduce the extent of inhibition of vulcanization by a foaming agent unlike the conventional art. Thereby it is possible to realize a vulcanization speed as fast as that obtained in the case where only the sulfur is used. It is also possible to obtain vulcanization efficiency as high as that obtained in the case where only the sulfur is used. Further by using the sulfur and the thiourea in combination and appropriately adjusting the amount thereof, it is possible to accomplish reduction of the electric resistance value and compression set as well as efficient improvement of the vulcanization speed, while suppressing occurrence of blooming and stain of a photosensitive member. Further the surface of a vulcanized tube is preferable. Furthermore it is possible to prevent the vulcanized tube from getting out of shape when it is produced by a vulcanizer and a defective production caused thereby. Therefore it is possible to improve productivity. In addition, it is possible to make diameters of cells uniform and very small. Thus the conductive roller of the third invention has a high strength and a very favorable foamed shape.

To achieve the fourth object, the fourth invention provides a polymer composition for a conductive roller containing a carbon-to-carbon double bond and a halogen as its main component, a chemical foaming agent, sulfur, and triazine and/or its derivative.

The polymer composition for a conductive roller of the fourth invention contains the carbon-to-carbon double bond and the halogen as its main component, the chemical foaming agent, the sulfur, the triazine and/or its derivative. Thus the sulfur and the triazine and/or its derivative are capable of operating independently in a separate reaction mechanism without interfering with each other. Therefore the vulcanizing system of the triazine and/or its derivative achieves a low compression set. In addition, the vulcanizing system of the sulfur makes a vulcanization speed high. Thus it is possible to improve productivity. In addition, there is no problem in inhibition of vulcanization, obtain a preferable foamed state, and enlarge a nip width. Further, compared with ordinary vulcanizing accelerators of sulfur, the triazine and/or its derivative are kind to environment, can be handled easily, and is superior in workability. By-products hardly result from the triazine and/or its derivative in a vulcanization time. Thus it is possible to reduce the degree of stain of a photosensitive member.

That is, in the fourth invention, by using the chemical foaming agent, the sulfur, and the triazine and/or its derivative in combination, it is possible to reduce the extent of inhibition of vulcanization by a foaming agent unlike the conventional art. Thereby it is possible to realize a vulcanization speed as fast as that obtained in the case where only the sulfur is used. It is also possible to obtain vulcanization efficiency as high as that obtained in the case where only the sulfur is used. Further by using the sulfur and the triazine and/or its derivative in combination and appropriately adjusting the amount thereof, it is possible to accomplish reduction of the electric resistance value and compression set as well as efficient improvement of the vulcanization speed, while suppressing occurrence of blooming and stain of a photosensitive member. Further the surface of a vulcanized tube is preferable. Furthermore it is possible to prevent the vulcanized tube from getting out of shape when it is produced by a vulcanizer and a defective production caused thereby. Therefore it is possible to improve productivity. In addition, it is possible to make diameters of cells uniform and very small. Thus the conductive roller of the fourth invention has a high strength and a very favorable foamed shape.

More specifically, as the epichlorohydrin rubber, it is possible to exemplify GECO (ethylene oxide-epichlorohydrin-allyl glycidyl ether copolymer) and ECO (ethylene oxide-epichlorohydrin copolymer). The main component of the rubber composition of the first invention is the epichlorohydrin rubber containing the ethylene oxide at not less than 55 mol % nor more than 95 mol % and favorably not less than 55 mol % nor more than 80 mol %. Thereby while maintaining a low electric resistance, it is possible to accomplish a low compressive strain and prevent stain of a photosensitive member.

If the content of the ethylene oxide is less than 55 mol %, it is impossible to accomplish a low electric resistance value. On the other hand, if the content of the ethylene oxide is more than 95 mol %, the photosensitive member is very readily stained, and physical properties of the polymer composition such as a compression set deteriorate. If the content of the ethylene oxide is too large, the polymer is apt to crystallize and the electric resistance value will become high.

In the first invention, it is preferable the rubber component consists of the epichlorohydrin rubber. However it is possible to use a mixture of the epichlorohydrin rubber and other rubber materials. In the case where the mixture is used, the ratio of the epichlorohydrin rubber to the entire rubber component is favorably not less than 75 wt % and more favorably not less than 85 wt %. If the content of the epichlorohydrin rubber is less than 75 wt %, it is difficult to achieve a low electric resistance.

In the first invention, thioureas are added to 100 g of the rubber component at the rate of not less than 0.014 mol nor more than 0.080 mol, favorably not less than 0.016 mol nor more than 0.050 mol, and more favorably not less than 0.019 mol nor more than 0.040 mol.

By adding the thioureas-containing vulcanization (crosslinking) system to the entire polymer component in the above-described range, it is possible to obtain a high-performance polymer composition which hardly bleeds and stains the photosensitive member. Further because the molecular motion of the polymer is not prevented much, the polymer composition accomplishes a low electric resistance. Further the polymer composition has a low compression set and in addition has superior mechanical properties. Particularly, the first invention is made based on the finding of the following very useful phenomenon peculiar to the thioureas-using crosslinking system. That is, the electric resistance value of the polymer composition decreases in the case where the addition amount of the thioureas increases and thus the crosslinking density becomes higher.

If the thioureas are added to 100 g of the rubber component at the rate less than 0.014 mol, the photosensitive member is stained. On the other hand, if the thioureas are added to 100 g of the rubber component at the rate more than 0.080 mol, the thioureas bloom from the surface of the rubber, thus staining the photosensitive member and extremely deteriorating mechanical properties of the polymer composition such as breaking extension.

The compression set of the conductive polymer composition of the first invention is set to less than 15% and favorably less than 10%. If the compression set is more than 15%, there occurs problems in the durability and precision maintenance of an image-forming process system including the roller.

The volume resistivity value of the conductive polymer composition of the first invention is set to less than $10^{7.5}$ [$\Omega \cdot cm$] and favorably less than $10^{7.4}$ [$\Omega \cdot cm$], and more favorably less than $10^{7.3}$ [$\Omega \cdot cm$]. If its volume resistivity value is more than $10^{7.5}$ [$\Omega \cdot cm$], the charging efficiency of the photosensitive member will deteriorate in a charging roller and the toner transport efficiency will deteriorate in a developing roller. As a result, a formed image will be thin. If its volume resistivity value is more than $10^{7.5}$ [$\Omega \cdot cm$], it is necessary to apply a high voltage, which increases power consumption.

In the first invention, it is preferable that ethylene oxide is contained in 100 mol % of the rubber component at the rate not less than 55 mol % nor more than 95 mol % and favorably at the rate not less than 55 mol % nor more than 80 mol %.

If the ethylene oxide is contained in the rubber component at the rate less than 55 mol %, it is difficult for the polymer composition to have a low electric resistance value. On the other hand, if the ethylene oxide is contained therein at the rate more than 95 mol %, the photosensitive member will be stained to a high extent and physical properties of the polymer composition such as the compression set will deteriorate.

In the first, second, third, and fourth inventions, it is preferable that the polymer composition does not contain a lead compound as a filler (acid accepting agent or activator in crosslinking reaction). The lead compound such as trilead tetroxide has been conventionally frequently used as the acid accepting agent and as the activator in a crosslinking reaction. However, the polymer composition not containing the lead compound is favorable in improving the electric resistance and the compression set and not staining the photosensitive member. In consideration of workability and environmental staining, the lead compound is restricted in its use mode and use amount. Thus it is preferable for the polymer composition not to contain the lead compound.

In the first, second, third, and fourth inventions, zinc oxide serving as an assistant crosslinking agent is added to 100 parts by weight of the rubber component or to 100 parts by weight of the entire polymer component at not less than 0.1 parts by weight nor more than 20.0 parts by weight and favorably at not less than 0.5 parts by weight nor more than 15.0 parts by weight and more favorably at not less than 1.0 part by weight nor more than 10.0 parts by weight. Thereby in the first, second, and third inventions, while maintaining a low volume resistivity, it is possible to reduce the compression set of the polymer composition. In the second, third, and fourth inventions, it is possible to efficiently progress the vulcanization by sulfur.

If the zinc oxide is added to 100 parts by weight of the rubber component or to 100 parts by weight of the entire polymer component at less than 0.1 parts by weight, in the first, second, and third inventions, the crosslinking density cannot be increased, the compression set is liable to be high, and the volume resistivity is apt to be high. If the zinc oxide is added to 100 parts by weight of the rubber component or to 100 parts by weight of the entire polymer component at less than 0.1 parts by weight, in the fourth invention, it is impossible to expect improvement of the efficiency of the vulcanization by sulfur. On the other hand, if the zinc oxide is added to 100 parts by weight of the rubber component or to 100 parts by weight of the entire polymer component at more than 20.0 parts by weight, higher effect cannot be expected and the polymer composition will be expensive and its hardness will be higher.

In the first, second, and third inventions, as the thioureas, it is preferable to use one or a plurality of thioureas selected from among a group consisting of tetramethylthiourea, trimethylthiourea, ethylene thiourea, and $(C_nH_{2+1}NH)_2C=S$ (n=integers 1-10).

The thiourea serving as a crosslinking agent is capable of improving reactivity. The thiourea is particularly effective in the case where it is used in combination with an epichlorohydrin polymer. As the thiourea to be used in the first, second, and third inventions, it is preferable to use the tetramethylthiourea, the trimethylthiourea, and the ethylene thiourea, and thioureas shown by the chemical formula $(C_nH_{2n+1}NH)_2C=S$ (n=1-5 and favorably, n=1-4). As the value of n becomes smaller, the reactivity of the thioureas serving as the crosslinking agent becomes increasingly high.

In the first, second, and third inventions, it is preferable that the polymer composition contains the thioureas as a master batch. By using the thioureas not as powder but as the master batch, it is possible to take consideration for an operator and environment. Thus it is possible to improve workability. Even in the case where the kneading time period is very short by adopting B-type kneading, the thioureas can be dispersed uniformly in the polymer and thus kneading processability can be improved greatly. Therefore, even though the B-type kneading is made by the enclosed-type kneading apparatus such as a kneader or a Banbury mixer, the polymer composition has favorable properties.

In the first, second, and third inventions, it is preferable that the master batch of the thioureas contains acrylic resin serving as a binder. More specifically, it is preferable to compose the master batch of the thioureas and ethylene methyl acrylate and add the master batch to the rubber component. As the binder of the master batch, in addition, chlorinated polyethylene and thermoplastic urethane are preferably used because they are compatible with the epichlorohydrin polymer. The weight ratio between the thioureas and the binder is favorably in the range of 90:10-60:40.

To improve dependency of the electric resistance value on environment, an electroconductive agent such as carbon may be added to the polymer composition of the first, second, third and fourth inventions in a range in which the electroconductive agent does not deteriorate ionic conductivity completely.

In the first invention, as the rubber material other than the epichlorohydrin rubber, the following rubber materials can be preferably used singly or in combination: ethylene-propylene-diene rubber (EPDM), butadiene rubber (BR), isoprene rubber (IR), chloroprene rubber (CR), natural rubber (NR), acrylonitrile-butadiene rubber (NBR), styrene butadiene rubber, styrene rubber (SBR), butyl rubber (M), halogenated butyl rubber, polyisobutylene, chlorosulfonated polyethylene rubber (CSU), acrylic rubber (ACM, ANM), urethane rubber (U), silicone rubber (Si), epichlorohydrin homopolymerized rubber (CO), and chlorinated polyethylene (CPE).

Chlorine-containing polymers such as chloroprene rubber, epichlorohydrin homopolymerized rubber, chlorinated polyethylene are preferable because the chlorine-containing polymer has an advantage that by utilizing the chlorine, the thioureas allows the chlorine-containing polymer to be easily co-crosslinked with the epichlorohydrin rubber.

The present invention provides a conductive roller having an elastic layer formed by molding the polymer composition of the first invention. Owing to the use of the polymer composition of the first invention, the conductive roller has high performance of reducing the electric resistance and the compression set and preventing the photosensitive member from being stained. Accordingly the conductive roller is capable of applying to recent outstanding progress in forming a high-quality image by digital image processing technique and color image processing technique. The conductive roller can be used preferably as a developing roller, a charging roller, a transfer roller for a color copying machine or a color printer.

In the second and third inventions, the main component of the polymer composition has the carbon-to-carbon double bond and the halogen. Thus by using the sulfur with the thioureas in combination, the thioureas react mainly with the halogen such as chlorine, and $C=C$ reacts mainly with the sulfur. Therefore the polymer composition can be crosslinked effectively at both points, vulcanized at a high speed, and can accomplish a low electric resistance without generating blooming or staining the photosensitive member.

In the second, third, and fourth inventions, as the polymer having the carbon-to-carbon double bond and the halogen, a polymer having ionic conductivity is preferable. Thus the epichlorohydrin polymer is preferable. The epichlorohydrin-ethylene oxide-allyl glycidyl ether copolymer is particularly preferable. Thereby the polymer composition is capable of having a low electric resistance while maintaining the performance of providing a low compression set.

As the epichlorohydrin polymer, in addition to the epichlorohydrin-ethylene glycidyl ether copolymer, it is possible to list an epichlorohydrin-allyl glycidyl ether copolymer, an epichlorohydrin-propylene oxide-allyl glycidyl ether copolymer, and an epichlorohydrin-ethylene oxide-propylene oxide-allyl glycidyl ether copolymer.

The epichlorohydrin polymer containing a large amount of the ethylene oxide is particularly preferable. It allows the vulcanization speed to be high and composes a conductive polymer composition having a low volume resistivity value. It is preferable that the epichlorohydrin polymer contains the ethylene oxide at not less than 55 mol % nor more than 95 mol %.

In the second, third, and fourth inventions, the polymers each having the carbon-to-carbon double bond and the halogen can be used singly or in combination. In addition to these polymers, chloroprene rubber (CR) and chlorinated natural rubber can be used. The chloroprene rubber is particularly preferable.

In the second, third, and fourth inventions, the polymer having the carbon-to-carbon double bond and the halogen can be mixed with one or a plurality of other polymer components. In mixing the polymer having the carbon-to-carbon double bond and the halogen and other polymer components with each other, the former is used at not less than 50 wt %, favorably at not less than 70 wt %, and more favorably at not less than 80 wt % for the entire polymer component. As the other polymer components to be mixed with the polymer having the carbon-to-carbon double bond and the halogen, the following polymers can be used: ethylene oxide-propylene oxide-allyl glycidyl ether copolymer, acrylonitrile-butadiene rubber, styrene-butadiene rubber, ethylene-propylene-diene copolymer, epichlorohydrin homopolymer, epichlorohydrin-ethylene oxide copolymer, epichlorohydrin-propylene oxide copolymer, and epichlorohydrin-ethylene oxide-propylene oxide copolymer.

In the second and third inventions, the thioureas are added to 100 g of an entire polymer component at the rate not less than 0.0009 mol nor more than 0.0800 mol and favorably at the rate not less than 0.0015 mol nor more than 0.0400 mol.

By adding the thioureas to the entire polymer component at the above-described range, it is possible to obtain a high-performance polymer composition. More specifically, it is possible to make vulcanization tight and make it difficult for blooming and stain of the photosensitive member to occur, realize a low electric resistance because the molecular motion of the polymer is not prevented much. Further the polymer composition has a low compression set and in addition has superior mechanical properties. It is possible for the polymer composition to decrease the electric resistance value in the case where the crosslinking density is increased by increasing the addition amount of the thioureas.

If the thioureas are added to 100 g of the entire polymer component at the ratio less than 0.0009 mol, it is difficult to improve the compression set or reduce the electric resistance value. Further in the case where the polymer composition is foamed, it is difficult to prevent a foaming agent from inhibiting vulcanization and the polymer composition from getting out of shape and making a defective product in the case where it is vulcanized by a vulcanizer.

On the other hand, if the thioureas are added to 100 g of the rubber component at the rate more than 0.0800 mol, the thioureas bloom from the surface of the polymer composition, thus staining the photosensitive member and extremely deteriorating mechanical properties of the polymer composition such as breaking extension. The entire polymer component means a polymer having a carbon-to-carbon double bond and a halogen and other polymer components.

In the second, third, and fourth inventions, sulfur is added to 100 parts by weight of the entire polymer component at the rate not less than 0.1 parts by weight nor more than 5.0 parts by weight and favorably at the rate not less than 0.2 parts by weight nor more than 2.0 parts by weight.

If less than 0.1 parts by weight of the sulfur is added to 100 parts by weight of the entire polymer component, the vulcanizing speed of the entire polymer composition is low and hence low productivity. On the other hand, if more than 5.0 parts by weight of the sulfur is added thereto, there is a possibility that the compression set is high or the sulfur and an accelerator bloom.

In the second and third inventions, it is preferable to use the thioureas and a guanidine accelerator in combination. The use of the thioureas in combination with the guanidine accelerator accelerates the crosslinking reaction of the thioureas and improves productivity. The guanidine accelerator includes di-ortho-tolylguanidine, 1,3-diphenylguanidine, 1-ortho-tolylbiguanide, di-ortho-tolylguanidine salt of dicatechol borate.

A suitable mixing amount of the guanidine accelerator can be selected according to the kind thereof to be used. It is preferable to add not less than 0.1 parts by weight of the guanidine accelerator nor more than 4.0 parts by weight thereof to 100 parts by weight of the entire polymer component. The increase in the amount of the guanidine accelerator and the thioureas improves the crosslinking speed and increases the crosslinking density.

The value of the compression set of the polymer composition of the second, third, and fourth inventions measured by a method which will be described later is favorably at less than 20% and more favorably less than 15%. If the polymer composition has the compression set more than 20%, the dimensional change of the polymer composition is too large when it is used as a developing roller, a charging roller, a transfer roller and the like. Consequently there occurs problems in the durability of the image-forming process and maintenance of dimensional accuracy. Hence the polymer composition cannot be used.

In a volume resistivity value test described in JIS K6911, the volume resistivity value of the polymer composition of the second, third, and fourth inventions measured at an applied voltage of 1000V is not less than $10^{4.0}$ [Ω·cm] nor more than $10^{12.0}$ [Ω·cm] and more favorably not less than $10^{4.0}$ [Ω·cm] nor more than $10^{9.5}$ [Ω·cm]. By making the electric resistance of the polymer composition low to allow it to have a proper electrical conductivity, the polymer composition can be preferably used for the conductive roller such as the transfer roller and the conductive belt and the like.

In the second, third, and fourth inventions, a vulcanizing accelerator may be used in combination with sulfur. It is preferable to combine the sulfur, the vulcanizing accelerator, dibenzothiazolyl disulfide, and tetramethylthiuram monosulfide with one another. Instead of the dibenzothiazolyl disulfide, 2-mercaptobenzothiazole may be used.

It is preferable to add not less than 0.2 parts by weight nor more than four parts by weight of the vulcanizing accelerator to 100 parts by weight of the entire polymer component.

In the second, third, and fourth inventions, a preferable vulcanizing system is composed of a mixture of sulfur/dibenzothiazolyl disulfide/tetramethylthiuram monosulfide=1.5/1.5/0.5 or a mixture of sulfur/2-mercaptobenzothiazole/tetramethylthiuram monosulfide=1.5/1.5/0.5.

Thereby it is possible to shorten the vulcanizing time period, accomplish co-crosslinking efficiently, reduce the degree of staining of the photosensitive member, and reduce the degree of the compression set.

The present invention provides a conductive roller using the polymer composition of the second invention. The polymer composition of the second invention is vulcanized quickly, low in the compression set, does not bloom, and hardly stains the photosensitive member. Thus the conductive roller using the polymer composition can be preferably used as the developing roller, the transfer roller or the charging roller and the like.

The present invention also provides a conductive belt using the polymer composition of the second invention. The polymer composition of the second invention is excellent in properties. Thus the conductive belt using the polymer composition can be preferably used for the transfer belt or the like.

To form the conductive belt, known methods can be used. More specifically, the polymer composition (kneaded material) is extruded in the shape of a belt by an extrusion molding machine. Then the polymer composition is vulcanized at 160° C. for 10-70 minutes to form the body of the belt. The vulcanization temperature may be set around 160° C. in dependence on necessity. As in the case of the conductive roller, it is preferable to set a vulcanization condition.

In the third and fourth inventions, it is preferable that the chemical foaming agent is a hydrazine derivative. In particular, it is preferable that the hydrazine derivative is 4,4'-oxybis (benzene sulfonyl hydrazide). Thereby it is possible to reduce variations of diameters of cells and distribute the cells uniformly and hence obtain a conductive foamed layer having little variations in hardness.

As the hydrazine derivative, benzene sulfonyl hydrazide and toluenesulfonyl hydrazide are preferable.

In the third and fourth inventions, the chemical foaming agent is added to 100 parts by weight of the entire polymer component at not less than 0.5 parts by weight nor more than 20 parts by weight and favorably at not less than 1.0 part by weight nor more than 15 parts by weight.

If less than 0.5 parts by weight of the chemical foaming agent is added to 100 parts by weight of the entire polymer component, foaming does not occur sufficiently and the hardness will be high. On the other hand, if more than 20 parts by weight of the chemical foaming agent is added to 100 parts by weight thereof, the cost of the polymer composition will be high. In addition, in dependence on the kind of the foaming agent or the kind of rubber, blooming or stain of the photosensitive member is apt to occur.

In the case where the 4,4'-oxybis (benzene sulfonyl hydrazide) is used, it is preferable to add not less than 2 parts by weight nor more than 10 parts by weight to 100 parts by weight of the entire polymer component.

In the third and fourth inventions, the vulcanizing system consists of a combination of sulfur and thiourea or a combination of sulfur, triazine and/or its derivative. Thus the vulcanizing system of the third and fourth inventions makes a scorching time shorter than a vulcanizing system consisting of a single vulcanizing agent. In particular, the vulcanizing system of the third and fourth inventions allows production of the conductive roller by a continuous vulcanization of a foam using an ionic-conductive polymer such as epichlorohydrin polymer or the like. The continuous vulcanization eliminates loss of rubber, reduces a time required for production, and the manufacturing cost and in addition makes the diameter of foamed cells small.

It is preferable that in the polymer composition for the conductive roller of each of the third and fourth inventions, the value of scorch $t_5$ (minute) at 130.0° C.±0.5° C. is not less than 1.5 minutes nor more than 20 minutes in a Mooney scorch test of the physical test method of unvulcanized rubber described in JIS K6300.

If the value of scorch $t_5$ is less than 1.5 minutes, the vulcanizing speed is too high. Thus the rubber is burnt in an extruder and the conductive roller cannot be produced. Otherwise the vulcanization proceeds gradually before a continuous extrusion operation is performed subsequently to a kneading operation and the rubber is burnt. On the other hand, if the value of scorch $t_5$ is more than 20 minutes, the polymer composition cannot be vulcanized so strong as to be transported by a conveyor or a roller by quickly progressing the vulcanization at an early stage in the process of the continuous vulcanization.

The present invention provides a conductive roller using the polymer composition (for a conductive roller) of the third invention. The polymer composition of the third invention can be vulcanized at a high speed, has a low compression set, does not generate blooming, allows the strength of a molded foam to be high, and can be produced with high productivity. Thus the conductive roller formed by molding the polymer composition can be used preferably as a developing roller, a transfer roller, and a charging roller and the like and is particularly suitable for the transfer roller of a color copying machine and a color printer.

In the third and fourth inventions, in the conductive roller foamed with the chemical foaming agent, the maximum diameter of foamed cells thereof is less than 100 µm, favorably less than 80 µm, and more favorably less than 75 µm. Thereby it is possible to obtain a high-quality image.

In the fourth invention, the polymer composition contains the polymer having the carbon-to-carbon double bond and the halogen as its main component. Thus by using the sulfur and the triazine and/or its derivative in combination, the triazine and/or its derivative react mainly with the halogen such as chlorine, and C═C reacts mainly with the sulfur. Therefore the polymer composition can be crosslinked effectively at both points, vulcanized at a high speed, and can accomplish a low electric resistance without generating blooming or staining the photosensitive member.

In the fourth invention, it is preferable that as the triazine and/or its derivative, one or a plurality of triazines selected from among a group consisting of 2,4,6-trimelcapto-S-triazine and 2-dialkylamino-4,6-dimelcapto-S-triazine are used. In consideration of the vulcanization speed, the 2-dialkylamino-4,6-dimelcapto-S-triazine is favorable.

The vulcanizing system containing the triazine and/or its derivative as its main component makes vulcanization tight, makes it difficult for the polymer composition to bleeding and the photosensitive member to be stained, and does not prevent the molecular motion of the polymer. Therefore it is possible to manufacture a roller having a low electric resistance.

It is preferable to add magnesium oxide to the polymer composition of the fourth invention because the crosslinking speed can be accelerated by triazine and/or its derivative. Further it is possible to improve a crosslinking density to be obtained by the triazine and/or its derivative.

Magnesium oxide is added to 100 parts by weight of the entire polymer component at not less than 0.2 parts by weight thereof nor more than 15 parts by weight thereof, favorably at not less than 1.0 part by weight thereof nor more than 10 parts by weight thereof, and more favorably at not less than 1.5 part by weight thereof nor more than 6 parts by weight thereof.

If less than 0.2 parts by weight of the magnesium oxide is added to 100 parts by weight of the entire polymer component, the polymer composition has above-described effect in a lower extent. On the other hand, if more than 15 parts by weight of the magnesium oxide is added to 100 parts by weight thereof, above-described effect cannot be obtained at a higher extent and the hardness and the cost will be higher.

The entire polymer component described in the specification means a polymer having a carbon-to-carbon double bond and a halogen and other polymer components.

In the fourth invention, the triazine and/or its derivative are added to 100 g of the entire polymer component at the rate not less than 0.0004 mol nor more than 0.0500 mol and favorably not less than 0.0010 mol nor more than 0.0300 mol.

By adding the triazine and/or its derivative to the entire polymer component in the above-described range, it is possible to obtain a high-performance polymer composition for a conductive roller. More specifically, it is possible to make the vulcanization tight and make it difficult the polymer composition to bloom and the photosensitive member to be stained, realize a low electric resistance because the molecular motion of the polymer is not prevented much. Further the polymer composition is superior in reducing the compression set and in other mechanical properties.

If the triazine and/or its derivative are added to 100 g of the entire polymer component at the rate less than 0.0004 mol, it is difficult to improve the compression set or prevent a foaming agent from inhibiting the vulcanization and the polymer composition from getting out of shape in the case where the polymer composition is vulcanized by using a vulcanizer and a defective production caused thereby. On the other hand, if the triazine and/or its derivative are added to 100 g of the entire polymer component at the rate more than 0.0500 mol, the triazine and/or its derivative bloom from the surface of the polymer composition, thus staining the photosensitive member and extremely deteriorating mechanical properties of the polymer composition such as breaking extension.

In the polymer composition of the fourth invention, it is possible to adjust the vulcanizing speed, the electric resistance value, and the foaming ratio to a required level respectively by appropriately selecting the mixing ratio between sulfur and triazine.

The present invention provides the conductive roller using the polymer composition of the fourth invention. The polymer composition of the fourth invention can be vulcanized at a high speed, has a low compression set, does not generate blooming, allows the strength of a molded foam to be high, and can be produced with high productivity. Thus the conductive roller formed by molding the polymer composition can be used preferably as a developing roller, a transfer roller, and a charging roller and is particularly suitable for the transfer roller for a color copying machine and a color printer.

Hydrotalcite may be added to the polymer composition of the first, second, third, and fourth inventions. The hydrotalcite is added to 100 parts by weight of a chlorine-containing polymer at not less than 0.5 parts by weight nor more than 15 parts by weight, favorably at not less than 1 part by weight nor more than 10 parts by weight, and more favorably at not less than 2 parts by weight nor more than 6 parts by weight. Thereby it is possible to obtain high crosslinking efficiency and prevent the photosensitive member from being stained.

An age resistor may be added to the polymer composition of the first, second, third, and fourth inventions. The age resistor is added to 100 parts by weight of the entire polymer component at not less than 0.1 parts by weight nor more than 10 parts by weight, favorably at not less than 2 part by weight nor more than 8 parts by weight, and more favorably at not less than 3 parts by weight nor more than 7 parts by weight. Thereby it is possible to suppress deterioration by ozone, oxidative deterioration of the surface of the roller, and oxidative deterioration-caused rise of the resistance. Thereby the conductive roller has a small variation in the resistance after continuous energization.

As the age resistor, it is possible to list imidazoles such as 2-mercaptobenzimidazole; amines such as phenyl -α-naphthylamine, N,N'-di-B-naphthyl-p-phenylenediamine; N-phenyl-N'-isopropyl-p-phenylenediamine; and phenols such as di-t-butyl-p-cresol, and styrenated phenol. In particular, CD (4,4'(α,α-dimethylbenzyl)diphenylamine) of the amines, MB (2-mercaptobenzimidazole) of the imidazoles, MBZ (zinc salt of 2-melcaptobenzimidazole), NBC (nickel dibutyldithiocarbamate) of the phenols are effective. Although these age resistors can be used singly, it is preferable to use two or three thereof in combination to prevent occurrence of blooming.

In the first, second, third, and fourth inventions, the vulcanization can be accomplished by conventional methods. For example, for mass production, it is preferable to vulcanize the polymer composition in the vulcanizer of pressurized water vapor type. Press vulcanization may be used. To foam the polymer composition, two-stage press foaming method can be used. Because the triazine and/or its derivative may deteriorate releasability of the vulcanized polymer composition, it is preferable to make release treatment. For example, it is preferable to coat the surface of a die with fluorine. In any of the vulcanizing methods, secondary vulcanization may be performed as necessary.

It is preferable to use the polymer composition of each of the first, second, third, and fourth inventions by melting and kneading the polymer having the carbon-to-carbon double bond and the halogen as its main component or the rubber component, the chemical foaming agent, the sulfur, the thioureas (or triazine and/or its derivative), and additives (vulcanization accelerator, filler, acid accepting agent, age resistor and the like) to be added as necessary. Melting and kneading can be carried out by ordinary methods. For example, the above-described components are kneaded at 20° C.-130° C. for 2-10 minutes with a known rubber-kneading apparatus such as an open roll or an enclosed type kneading apparatus.

The conductive roller can be produced by conventional methods. For example, the polymer composition (kneaded material) of each of the first, second, third, and fourth inventions is preformed into the shape of a tube with a single axis extruder. Then the preform is vulcanized at 160° C. for 10-70 minutes with the vulcanizer to form a hollow vulcanized tube. Thereafter a core metal is inserted into the hollow portion of the vulcanized tube. After the surface of the tube is polished, the tube is cut to a predetermined size.

The vulcanizing condition such as a vulcanizing time period varies according to the kind of the polymer (rubber component), the crosslinking agent, and the vulcanization accelerator and the mixing ratio among them. In the case where the polymer composition is foamed, the vulcanizing condition varies according to the kind and amount of the foaming agent and the assistant foaming agent. In both cases, an optimum vulcanizing time period should be set by using a vulcanization testing rheometer (for example, cure meter). The vulcanization temperature may be set around 160° C. in dependence on necessity, as described above. To prevent the photosensitive member from being stained and reduce the compression set, it is preferable to set the condition of the vulcanization temperature and the vulcanization time period so that the polymer composition is vulcanized sufficiently.

DETAILED DESCRIPTION OF THE PREFERRED EMBODIMENTS

The embodiments of the present invention will be described below.

As the rubber component of the polymer composition for a conductive roller of the first invention, only an epichlorohydrin rubber consisting of ethylene oxide and epichlorohydrin copolymerized at the ratio of 61 mol % (ethylene oxide):39 mol % (epichlorohydrin) is used.

The following components are added to 100 parts by weight of the rubber: 2.00 parts by weight of ethylene thiourea serving as a crosslinking agent, 2 parts by weight of carbon serving as a coloring filler, 3 parts by weight of hydrotalcite serving as a acid accepting agent, 1.5 parts by weight of zinc oxide serving as an assistant crosslinking agent, and 1 part by weight of stearic acid. The ethylene thiourea is added to 100 g of the epichlorohydrin rubber at the rate of 0.0196 mol.

The polymer composition for the conductive roller containing the rubber component, the crosslinking agent, and other components are kneaded by using a known rubber kneading apparatus such as an enclosed-type kneader. Then, the mixture is molded with an extruder or the like and vulcanized. Thereby a conductive vulcanized rubber for use in the conductive roller or the like is obtained.

In a compression set test of the conductive vulcanized rubber described in JIS K6262, the compression set thereof measured at 70° C. for 22-24 hours is 9.5%; and in a volume resistivity value test described in JIS K6911, the volume resistivity value thereof measured at an applied voltage of 1000V is $10^{7.17}$ [Ω·cm].

Figure 1:
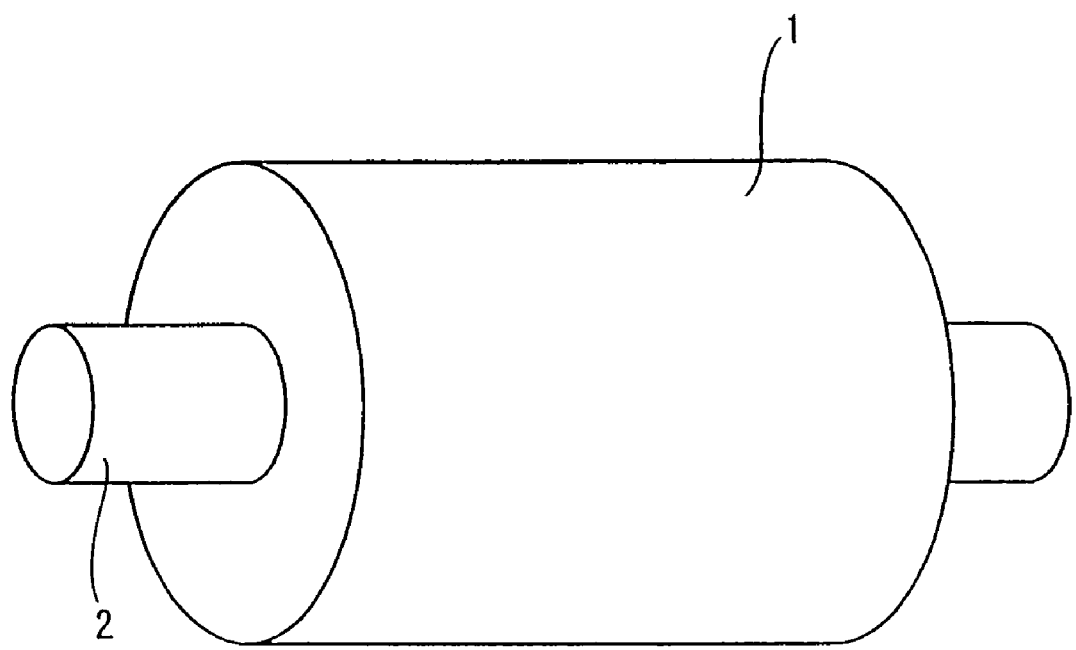
FIG. 1 is a schematic view showing a conductive roller of the present invention.

An unvulcanized polymer composition for the conductive roller is preformed into the shape of a tube with a single axis extruder. Then the preform is introduced into a vulcanizer of pressurized water vapor type to vulcanize the preform at 160° C. for 10-70 minutes. Thereby a vulcanized rubber tube is obtained. A core metal consisting of a hot-melt adhesive agent-applied metal shaft is inserted into a hollow portion of a cylindrical conductive vulcanized tube to heat it and bond the core metal and the tube to each other. Then the surface of the rubber tube is polished. Thereafter the tube is cut to a predetermined size. In this way, a conductive roller 1 is obtained. As shown in FIG. 1, the conductive roller 1 is approximately cylindrical. A shaft 2 is inserted into the conductive roller 1. The conductive roller 1 can be formed by continuous vulcanization or press vulcanization in addition to the vulcanization carried out by the vulcanizer.

Thereby the conductive roller thus formed has a low volume resistivity value and a low compression set. Thus the conductive roller is durable and hardly stains a photosensitive member. Thereby the conductive roller can be preferably used (as conductive rollers such) as a developing roller, a charging roller, a transfer roller for a color copying machine and a color printer. The conductive roller may be used as a foamed roll formed by adding foaming agents or assistant foaming agents to the polymer composition for the conductive roller.

As the polymer having the carbon-to-carbon double bond and the halogen, the polymer composition of the second invention contains 100 parts by weight of an epichlorohydrin (EP)-ethylene oxide (EO)-allyl glycidyl ether (AGE) copolymer (may be hereinafter referred to as GECO) in which the ethylene oxide, the epichlorohydrin, and the allyl glycidyl ether are copolymerized at the ratio of 56 mol %:40 mol %:4 mol %. The polymer composition further contains sulfur and thioureas.

More specifically, the following components are added to the polymer having the carbon-to-carbon double bond and the halogen: 0.67 parts by weight of the ethylene thiourea used as the thioureas, 0.57 parts by weight of di-ortho-tolylguanidine serving as a guanidine accelerator, 1.0 part by weight of sulfur, 1.0 part by weight of dibenzothiazolyl sulfide serving as a vulcanizing accelerator, 0.33 parts by weight of tetramethylthiuram monosulfide, 5 parts by weight of the zinc oxide serving as an assistant crosslinking agent, and fillers.

Owing to the components and the mixing ratios among them, it is possible to reduce the compression set of the polymer composition for the conductive roller and make the crosslinking speed high. Thus it is possible to improve the productivity of the conductive roller and the conductive belt. It is also possible to prevent the photosensitive member from being stained, reduce the compression set, and prevent occurrence of blooming.

The thioureas can be used as a master batch. The master batch is formed by mixing the ethylene thiourea and ethylene methyl acrylate at the rate of 8:2. By using a method similar to that of the first invention, the conductive roller 1 as shown in FIG. 1 can be obtained.

Figure 2:
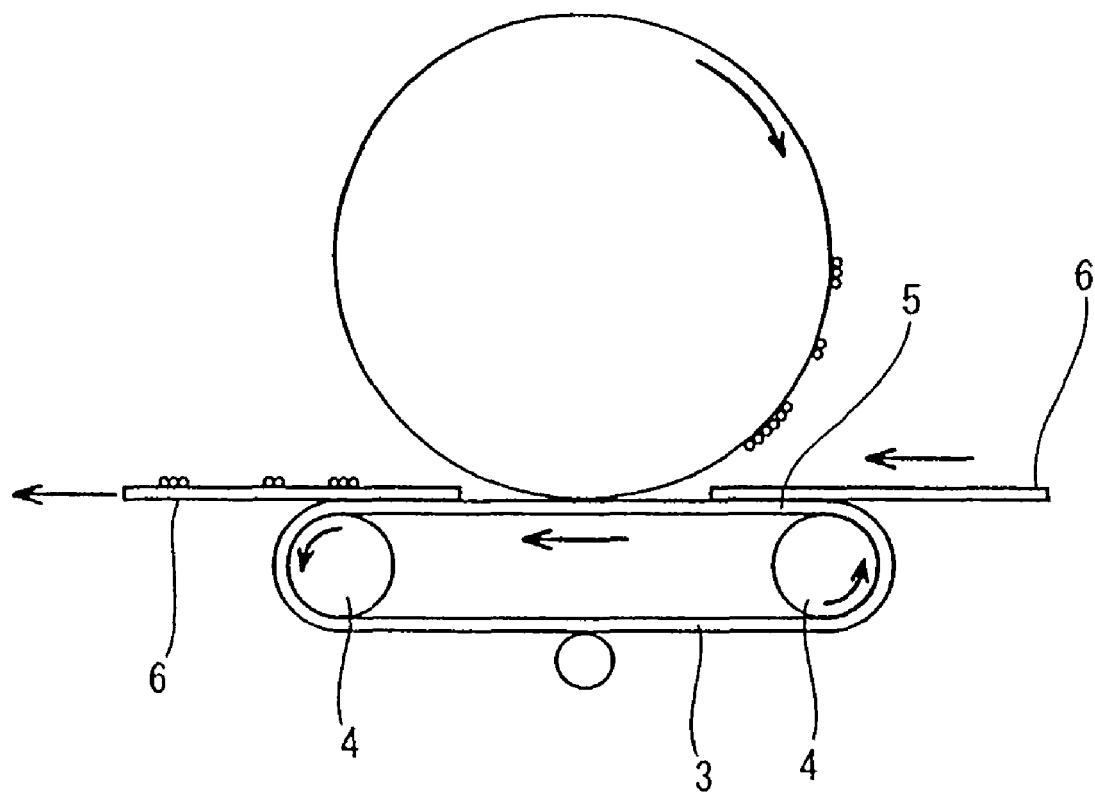
FIG. 2 is a schematic view showing a conductive belt of the present invention.

As shown in FIG. 2, a conductive belt 3 such as a transfer belt is produced from the polymer composition of the second invention. The conductive belt 3 is tight-stretched by two or more pulleys 4. The conductive belt 3 serves as a means for delivering a sheet 6 such as paper by movably holding it on a straight portion 5 thereof disposed at its upper side.

As the polymer having the carbon-to-carbon double bond and the halogen, the polymer composition of the third invention contains 100 parts by weight of the epichlorohydrin (EP)-ethylene oxide (EO)-allyl glycidyl ether (AGE) copolymer (GECO) in which the ethylene oxide, the epichlorohydrin, and the allyl glycidyl ether are copolymerized at the ratio of 56 mol %:40 mol %:4 mol %. The polymer composition further contains a chemical foaming agent, sulfur, and thioureas.

More specifically, the following components are added to the polymer having the carbon-to-carbon double bond and the halogen: 7.5 parts by weight of 4,4'-oxybis (benzene sulfonyl hydrazide) serving as the chemical foaming agent, 1.33 parts by weight of the ethylene thiourea used as the thioureas, 1.13 parts by weight of the di-ortho-tolylguanidine serving as the guanidine accelerator, 0.5 parts by weight of the powdery sulfur, 0.5 parts by weight of the dibenzothiazolyl sulfide serving as the vulcanizing accelerator, 0.17 parts by weight of the tetramethylthiuram monosulfide, 5 parts by weight of the zinc oxide serving as the assistant crosslinking agent, and fillers.

As the polymer having the carbon-to-carbon double bond and the halogen, the polymer of the fourth invention contains 100 parts by weight of the epichlorohydrin (EP)-ethylene oxide (EO)-allyl glycidyl ether (AGE) copolymer (GECO) in which the ethylene oxide, the epichlorohydrin, and the allyl glycidyl ether are copolymerized at the ratio of 56 mol %:40 mol %:4 mol %. The polymer composition further contains a chemical foaming agent, triazine and/or its derivative, and sulfur.

More specifically, the following components are added to the polymer having the carbon-to-carbon double bond and the halogen: 7.5 parts by weight of 4,4'-oxybis (benzene sulfonyl hydrazide) serving as the chemical foaming agent, 1.06 parts by weight of 2-di-n-butylamino-4,6-dimelcapto-S-triazine (:a kind of 2-dialkylamino-4,6-dimelcapto-S-triazine) as triazine and/or its derivative, 1.0 part by weight of powdery sulfur serving 1.0 part by weight of the dibenzothiazolyl sulfide serving as the vulcanizing accelerator, 0.88 parts by weight of the tetramethylthiuram monosulfide, 5 parts by weight of the zinc oxide serving as the assistant crosslinking agent, 3 parts by weight of magnesium oxide, and fillers.

By carrying out a method similar to that of the first invention, it is possible to obtain the conductive roller 1 as shown in FIG. 1. At a vulcanization time, the chemical foaming agent is gasified and foamed, and the crosslinking of the rubber component proceeds.

Owing to the components and the mixing ratios among them, it is possible to reduce the compression set of the conductive roller and make the crosslinking speed high. Thus it is possible to improve the productivity of the conductive roller. It is also possible to prevent the photosensitive member from being stained, occurrence of blooming, and vulcanization from being inhibited. Further it is possible to make the strength of the foamed conductive roller high. The conductive polymer composition of the fourth invention can be handled easily and has fine workability.

Experiment 1

Examples 1 through 10 of the polymer composition for the conductive roller of the first invention and comparison examples 1 through 12 will be described in detail below.

In the examples 1 through 10 and the comparison examples 1 through 12, materials (components) were kneaded by a kneader of enclosed type (DS10-40MWA-S, produced by Moriyama Seisakusho) at mixing ratios shown in tables 1 through 4. Rubber taken out as a ribbon from the kneader was introduced into an extruder having an inner diameter of 60 mm to extrude it as a hollow tube. The raw rubber tube was cut to a proper size and vulcanized at 160° C. for 20-70 minutes to obtain a vulcanized rubber tube.

Thereafter a hot-melt adhesive agent was applied to a shaft having the same shape of the charging roller mounted on a copying machine (IMAGIO MF2730 produced by Ricoh Inc.). Then the shaft was inserted into the vulcanized rubber tube. Then the vulcanized rubber tube was heated to bond the shaft thereto. In this way, a roller was obtained. The surface of the roller was polished until a predetermined size was obtained. The size of the roller was the same as that of the charging roller of the copying machine. That is, the outer diameter, the inner diameter, and the axial length of the rubber were 14 mm, 8 mm, and 317 mm respectively.

The rubber taken out from the kneader was extruded by a roller head extruder to mold the rubber into the shape of a sheet. Then the rubber was introduced into a die to perform press vulcanization at 160° C. for an optimum time period. Thereby a property-evaluating vulcanized rubber slab sheet or a property-evaluating vulcanized rubber specimen was prepared.

As the vulcanizing method, the rubber may be vulcanized in a vulcanizer by pressurized water vapor or a secondary vulcanization may be carried out.

TABLE 1

| | Mixed chemicals | General name/compound name | Example 1 | Example 2 | Example 3 | Example 4 | Example 5 |
|---|---|---|---|---|---|---|---|
| Polymer | Epichlomer D | ECO(EO:EP:AGE = 61:39:0) | 100 | 100 | 100 | 100 | 100 |
| | Epichlomer CG102 | GECO(EO:EP:AGE = 56:40:4) | | | | | |
| | (Trial product polymer) | GECO(EO:EP:AGE = 73:23:4) | | | | | |
| | Epichlomer C | GECO(EO:EP:AGE = 51:49:0) | | | | | |
| | Epichlomer CG | GECO(EO:EP:AGE = 41:52:7) | | | | | |
| | Neoprene WRT | CR | | | | | |
| Filler | Denca black | Carbon | 2 | 2 | 2 | 2 | 2 |
| | Soft calcium carbonate | Calcium carbonate | | | | | |
| | DHT-4A-2 | Hydrotalcite | 3 | 3 | 3 | 3 | 3 |
| | Red lead oxide | $Pb_3O_4$ | | | | | |
| Assistant agent | Zinc oxide (two kinds) | Zinc white | 1.5 | 1.5 | 1.5 | 1.5 | 1.5 |
| | Stearic acid 4931 | Stearic acid | 1 | 1 | 1 | 1 | 1 |
| | Sub | Sulfur fats and oils for animals and plants | | | | | |
| | Diamid 200 | Fatty amide | | | | | |
| | Stractol WA48 | Processing aid | | | | | |
| Vulcanizing | Powdery sulfur | sulfur | | | | | |
| | DCP | Dicumyl peroxide | | | | | |
| | Nocceler DM | Dibenzothiazolyl disulfide | | | | | |
| | Nocceler TS | Tetramethylthiuram monosulfide | | | | | |
| | Nocceler TT | Tetramethylthiuram disulfide | | | | | |
| | Accele 22-S | Ethylene thiourea | 2.00 | | | | 1.50 |
| | ETU-80% article | Ethylene thiourea/binder = 80/20 | | 2.50 | | | |
| | Accele EUR | Diethyl thiourea | | | 2.59 | | |
| | Accele BUR-F | Dibutyl thiourea | | | | 3.69 | |
| | Accele LUR | Dilauryl thiourea | | | | | |
| Mols of thioureas per 100 g of rubber | | | 0.0196 | 0.0196 | 0.0196 | 0.0196 | 0.0147 |
| Content of ethylene oxide in entire polymer (mol %) | | | 61 | 61 | 61 | 61 | 61 |
| Volume resistivity value of slab $\log_{10}R$ [Ω] * cm] | | | 7.17 | 7.15 | 7.11 | 7.07 | 7.50 |
| Peripheral nonuniformity of electric resistance of roller | | | 1.10 | 1.05 | 1.08 | 1.10 | 1.09 |
| Compression set | | | 9.5 | 9.6 | 5.9 | 7.0 | 9.3 |
| Stain of photosensitive member | | | ○ | ○ | ○ | Δ⁺ | ○ |

TABLE 2

| | Mixed chemicals | General name/compound name | Example 6 | Example 7 | Example 8 | Example 9 | Example 10 |
|---|---|---|---|---|---|---|---|
| Polymer | Epichlomer D | ECO(EO:EP:AGE = 61:39:0) | 100 | | | 90 | 80 |
| | Epichlomer CG102 | GECO(EO:EP:AGE = 56:40:4) | | | 100 | | |
| | (Trial product polymer) | GECO(EO:EP:AGE = 73:23:4) | | 100 | | | |
| | Epichlomer C | GECO(EO:EP:AGE = 51:49:0) | | | | | |
| | Epichlomer CG | GECO(EO:EP:AGE = 41:52:7) | | | | | 20 |
| | Neoprene WRT | CR | | | | 10 | |

TABLE 2-continued

|  | Mixed chemicals | General name/compound name | Example 6 | Example 7 | Example 8 | Example 9 | Example 10 |
|---|---|---|---|---|---|---|---|
| Filler | Denca black | Carbon | 2 | 2 | 2 | 2 | 2 |
|  | Soft calcium carbonate | Calcium carbonate |  |  |  |  |  |
|  | DHT-4A-2 | Hydrotalcite | 3 | 3 | 3 | 3 | 3 |
|  | Red lead oxide | $Pb_3O_4$ |  |  |  |  |  |
| Assistant agent | Zinc oxide (two kinds) | Zinc white | 1.5 | 1.5 | 1.5 | 1.5 | 1.5 |
|  | Stearic acid 4931 | Stearic acid | 1 | 1 | 1 | 1 | 1 |
|  | Sub | Sulfur fats and oils for animals and plants |  |  |  |  |  |
|  | Diamid 200 | Fatty amide |  |  |  |  |  |
|  | Stractol WA48 | Processing aid |  |  |  |  |  |
| Vulcanizing | Powdery sulfur | sulfur |  |  |  |  |  |
|  | DCP | Dicumyl peroxide |  |  |  |  |  |
|  | Nocceler DM | Dibenzothiazolyl disulfide |  |  |  |  |  |
|  | Nocceler TS | Tetramethylthiuram monosulfide |  |  |  |  |  |
|  | Nocceler TT | Tetramethylthiuram disulfide |  |  |  |  |  |
|  | Accele 22-S | Ethylene thiourea | 5.00 | 2.00 | 2.00 | 2.00 | 2.00 |
|  | ETU-80% article | Ethylene thiourea/binder = 80/20 |  |  |  |  |  |
|  | Accele EUR | Diethyl thiourea |  |  |  |  |  |
|  | Accele BUR-F | Dibutyl thiourea |  |  |  |  |  |
|  | Accele LUR | Dilauryl thiourea |  |  |  |  |  |
| Mols of thioureas per 100 g of rubber |  |  | 0.0490 | 0.0196 | 0.0196 | 0.0196 | 0.0196 |
| Content of ethylene oxide in entire polymer (mol %) |  |  | 61 | 73 | 56 | 55 | 57 |
| Volume resistivity value of slab $log_{10}R$ [$\Omega \cdot cm$] |  |  | 7.15 | 7.04 | 7.44 | 7.40 | 7.37 |
| Peripheral nonuniformity of electric resistance of roller |  |  | 1.11 | 1.12 | 1.13 | 1.15 | 1.12 |
| Compression set |  |  | 9.8 | 9.9 | 9.8 | 7.9 | 10.0 |
| Stain of photosensitive member |  |  | $\Delta^+$ | $\Delta^+$ | ◯ | $\Delta^+$ | ◯ |

TABLE 3

|  | Mixed chemicals | General name/compound name | Comparison Example 1 | Comparison Example 2 | Comparison Example 3 | Comparison Example 4 | Comparison Example 5 | Comparison Example 6 |
|---|---|---|---|---|---|---|---|---|
| Polymer | Epichlomer D | ECO(EO:EP:AGE = 61:39:0) |  |  | 100 | 100 |  |  |
|  | Epichlomer CG102 | GECO(EO:EP:AGE = 56:40:4) | 100 |  |  |  |  |  |
|  | (Trial product polymer) | GECO(EO:EP:AGE = 73:23:4) |  | 100 |  |  |  |  |
|  | Epichlomer C | GECO(EO:EP:AGE = 51:49:0) |  |  |  |  | 100 |  |
|  | Epichlomer CG | GECO(EO:EP:AGE = 41:52:7) |  |  |  |  |  | 100 |
|  | Neoprene WRT | CR |  |  |  |  |  |  |
|  | Denca black | Carbon | 2 | 2 | 2 | 2 | 2 |  |
|  | Soft calcium carbonate | Calcium carbonate |  |  |  |  |  |  |
|  | DHT-4A-2 | Hydrotalcite | 3 | 3 | 3 | 3 | 3 |  |
|  | Red lead oxide | $Pb_3O_4$ |  |  |  |  |  |  |
| Assistant agent | Zinc oxide (two kinds) | Zinc white | 5.0 | 5.0 | 1.5 | 0.0 | 1.5 |  |
|  | Stearic acid 4931 | Stearic acid | 1 | 1 | 1 | 1 | 1 | 1 |
|  | Sub | Sulfur fats and oils for animals and plants |  |  |  |  |  | 5 |
|  | Diamid 200 | Fatty amide |  |  |  |  |  |  |
|  | Stractol WA48 | Processing aid |  |  |  |  |  | 2 |
| Vulcanizing system | Powdery sulfur | sulfur | 1.5 | 1.5 |  |  |  |  |
|  | DCP | Dicumyl peroxide |  |  | 0.4 |  |  |  |
|  | Nocceler DM | Dibenzothiazolyl disulfide | 1.5 | 1.5 |  |  |  |  |
|  | Nocceler TS | Tetramethylthiuram monosulfide | 0.5 | 0.5 |  |  |  |  |
|  | Nocceler TT | Tetramethylthiuram disulfide |  |  |  |  |  | 0.5 |
|  | Accele 22-S | Ethylene thiourea |  |  |  | 2.00 | 2.00 | 1.2 |
|  | ETU-80% article | Ethylene thiourea/binder = 80/20 |  |  |  |  |  |  |
|  | Accele EUR | Diethyl thiourea |  |  |  |  |  |  |
|  | Accele BUR-F | Dibutyl thiourea |  |  |  |  |  |  |
|  | Accele LUR | Dilauryl thiourea |  |  |  |  |  |  |
| Mols of thioureas per 100 g of rubber |  |  | 0 | 0 | 0 | 0.0196 | 0.0196 | 0.0118 |
| Content of ethylene oxide in entire polymer (mol %) |  |  | 56 | 73 | 61 | 61 | 51 | 41 |
| Volume resistivity value of slab $log_{10}R$ [$\Omega \cdot cm$] |  |  | 8.10 | 7.50 | 9.06 | 7.70 | 7.59 | 7.65 |
| Peripheral nonuniformity of electric resistance of roller |  |  | 1.11 | 1.13 | 1.15 | 1.15 | 1.12 | 1.11 |
| Compression set |  |  | 19.6 | 30.2 | 2.3 | 50.2 | 7.9 | 4.7 |
| Stain of photosensitive member |  |  | ◯ | $\Delta^-$ | ◯ | X | ◯ | X |

TABLE 4

| | Mixed chemicals | General name/compound name | Comparison Example 7 | Comparison Example 8 | Comparison Example 9 | Comparison Example 10 | Comparison Example 11 | Comparison Example 12 |
|---|---|---|---|---|---|---|---|---|
| Polymer | Epichlomer D | ECO(EO:EP:AGE = 61:39:0) | | | 70 | 100 | 100 | 100 |
| | Epichlomer CG102 | GECO(EO:EP:AGE = 56:40:4) | | | | | | |
| | (Trial product polymer) | GECO(EO:EP:AGE = 73:23:4) | | | | | | |
| | Epichlomer C | GECO(EO:EP:AGE = 51:49:0) | | | | | | |
| | Epichlomer CG | GECO(EO:EP:AGE = 41:52:7) | 100 | | | | | |
| | Neoprene WRT | CR | | 100 | 30 | | | |
| Filler | Denca black | Carbon | | 22 | 2 | 2 | 2 | 2 |
| | Soft calcium carbonate | Calcium carbonate | 7.5 | | | | | |
| | DHT-4A-2 | Hydrotalcite | | 3 | 3 | | 3 | 3 |
| | Red lead oxide | Pb$_3$O$_4$ | | | | 5 | | |
| Assistant agent | Zinc oxide (two kinds) | Zinc white | | | | | 1.5 | 1.5 |
| | Stearic acid 4931 | Stearic acid | 1 | 1 | 1 | 1 | 1 | 1 |
| | Sub | Sulfur fats and oils for animals and plants | | | | | | |
| | Diamid 200 | Fatty amide | 2 | | | | | |
| | Stractol WA48 | Processing aid | | | | | | |
| Vulcanizing system | Powdery sulfur | sulfur | | | | | | |
| | DCP | Dicumyl peroxide | | | | | | |
| | Nocceler DM | Dibenzothiazolyl disulfide | | | | | | |
| | Nocceler TS | Tetramethylthiuram monosulfide | | | | | | |
| | Nocceler TT | Tetramethylthiuram disulfide | 0.5 | | | | | |
| | Accele 22-S | Ethylene thiourea | 1.2 | 2.00 | 2.00 | 1.6 | 1.00 | |
| | ETU-80% article | Ethylene thiourea/binder = 80/20 | | | | | | |
| | Accele EUR | Diethyl thiourea | | | | | | |
| | Accele BUR-F | Dibutyl thiourea | | | | | | |
| | Accele LUR | Dilauryl thiourea | | | | | | 8.08 |
| Mols of thioureas per 100 g of rubber | | | 0.0118 | 0.0147 | 0.0196 | 0.0157 | 0.0098 | 0.0196 |
| Content of ethylene oxide in entire polymer (mol %) | | | 41 | 0 | 43 | 61 | 61 | 61 |
| Volume resistivity value of slab log$_{10}$R [Ω · cm] | | | 7.68 | 6.66 | 7.74 | 7.81 | 7.79 | 7.63 |
| Peripheral nonuniformity of electric resistance of roller | | | 1.10 | 2.20 | 1.17 | 1.14 | 1.12 | 1.14 |
| Compression set | | | 23.3 | 7.0 | 5.6 | 11.5 | 10.4 | 11.5 |
| Stain of photosensitive member | | | X | ○ | ○ | ○ | X | Δ$^+$ |

The numerical values shown as mixing ratios in each table indicate parts by weight when the total of rubber components is set as 100. The unit of the compression set is %. The abbreviation GECO represents the epichlorohydrin-ethylene oxide-allyl glycidyl ether copolymer. The abbreviation ECO represents epichlorohydrin-ethylene oxide copolymer. The abbreviation EO represents ethylene oxide. The abbreviation EP represents the epichlorohydrin. The abbreviation AGE represents the allyl glycidyl ether.

Examples 1 Through 10

In any of the conductive polymer compositions of the examples 1 through 10, the content of the ethylene oxide of the epichlorohydrin rubber was specified to the above-described range. The thioureas were added to 100 g of the rubber at the mixing ratios in the range of 0.014 to 0.080 mol shown in the tables 1 and 2. The volume resistivity value and the compression set fell in the specified range respectively. By using the above-described method, the conductive rollers and the specimens composed of the polymer composition for the conductive roller were prepared.

Comparison Examples 1 Through 12

In any of the conductive polymer composition of the comparison examples 1 through 12, the content of the ethylene oxide of the epichlorohydrin rubber was out of the specified range, and the volume resistivity value and the compression set were also out of the specified range respectively. By mixing the components with one another at the mixing ratios shown in the tables 3 and 4 and carrying out the above-described method, the (conductive) rollers and the specimens were obtained.

The following measurements were conducted on the characteristics of the prepared rollers and specimens composed of the polymer composition for the conductive roller of each of the examples 1-10 and the comparison examples 1-12. The tables 1-4 show the results.

Examples 11 through 14 of the polymer composition of the second invention and comparison examples 13 through 17 will be described in detail below.

In the examples 11 through 14 and the comparison examples 13 through 17, components were kneaded at mixing ratios shown in tables 5 and 6 by the kneader of the enclosed type (DS10-40MWA-S, produced by Moriyama Seisakusho). The polymer composition taken out as a ribbon from the kneader was introduced into an extruder (φ60) to extrude it as a hollow tube. The rubber tube was cut to a proper size and vulcanized at 160° C. for 10-70 minutes to obtain a vulcanized rubber tube. The vulcanizing condition was appropriately adjusted with reference to data of t$_c$(90)(90% torque rise point: t$_{90}$)[minute] of a cure meter to obtain a sufficient vulcanization amount.

TABLE 5

| | General name/compound name | Example 11 | Example 12 | Example 13 | Example 14 |
|---|---|---|---|---|---|
| Polymer | GECO(EO:EP:AGE = 56:40:4) | 100 | 100 | 100 | 60 |
| | CR | | | | 40 |
| Filler | Carbon (for coloring) | 2 | 2 | 2 | 2 |
| | Synthetic hydrotalcite | 3 | 3 | 3 | 3 |
| Assistant agent | Zinc white | 5 | 5 | 5 | 5 |
| | Stearic acid | 1 | 1 | 1 | 1 |
| Vulcanizing system | Sulfur | 1.0 | 0.5 | 0.5 | 0.5 |
| | Dibenzothiazolyl disulfide | 1.0 | 0.5 | 0.5 | 0.5 |
| | Tetramethylthiuram monosulfide | 0.33 | 0.17 | 0.17 | 0.17 |
| | Ethylene thiourea | 0.67 | 1.33 | | 1.33 |
| | Ethylene thiourea/binder = 8/2 | | | 1.66 | |
| | Di-ortho-tolylguanidine | 0.57 | 1.13 | 1.13 | 1.13 |
| $T_{90}$ [minute] | | 17 | 22 | 21 | 21 |
| Compression set | | 18 | 11 | 10 | 11 |
| Generation of blooming | | ◯ | ◯ | ◯ | ◯ |

TABLE 6

| | General name/compound name | Comparison Example 13 | Comparison Example 14 | Comparison Example 15 | Comparison Example 16 | Comparison Example 17 |
|---|---|---|---|---|---|---|
| Polymer | GECO(EO:EP:AGE = 56:40:4) | 100 | 100 | 100 | 100 | 60 |
| | CR | | | | | 40 |
| Filler | Carbon (for coloring) | 2 | 2 | 2 | 2 | 2 |
| | Synthetic hydrotalcite | 3 | 3 | 3 | 3 | 3 |
| Assistant agent | Zinc white | 5 | 5 | 5 | 5 | 5 |
| | Stearic acid | 1 | 1 | 1 | 1 | 1 |
| Vulcanizing system | Sulfur | 6.0 | 1.5 | | | 1.5 |
| | Dibenzothiazolyl disulfide | 6.0 | 1.5 | | | 1.5 |
| | Tetramethylthiuram monosulfide | 2 | 0.5 | | | 0.5 |
| | Ethylene thiourea | | | 2.0 | 6.0 | |
| | Ethylene thiourea/binder = 8/2 | | | | | |
| | Di-ortho-tolylguanidine | | | 1.7 | 1.7 | |
| $T_{90}$ [minute] | | 15 | 15 | 34 | 15 | 20 |
| Compression set | | 66 | 28 | 3 | 3 | 32 |
| Generation of blooming | | X | ◯ | ◯ | X | ◯ |

Similarly to the experiment 1, charging rollers having the same size, property-evaluating vulcanized rubber slab sheets, and property-evaluating vulcanized rubber specimens were prepared.

Examples 11 Through 14

The sulfur, the vulcanization accelerator, the ethylene thiourea or a master batch thereof, the zinc oxide (zinc white), and the guanidine accelerator (di-ortho-tolylguanidine) were added to the epichlorohydrin-ethylene oxide-allyl glycidyl ether copolymer (GECO) at the ratios shown in the table 5 in each of the examples 11 through 13 and to a mixture (GECO:CR=60:40) of the GECO and CR (chloroprene) at the ratios shown in the table 5 in the example 14. Rollers and vulcanized rubber specimens composed of the polymer composition of the second invention were obtained by carrying out the above-described method.

In the example 13, ethylene methyl acrylate was used as a binder. A master batch composed of the ethylene thiourea (used as the thioureas)/binder=8/2 was prepared. Thioureas were added to 100 g of the GECO or 100 g of the mixture of the GECO+the CR at 0.0066 mol in the example 11, 0.0130 mol in the example 12, 0.0130 mol in the example 13, and 0.0130 in the example 14.

Comparison Examples 13 Through 17

The sulfur and the vulcanizing accelerator were added to the GECO at the ratios shown in the table 6 in the comparison examples 13 and 14, and to a mixture of the GECO and the CR (GECO:CR=60:40) at the ratios shown in the table 6 in the comparison example 17. The thiourea was not added to the GECO and the mixture of the GECO and the CR.

In the comparison examples 15 and 16, the thiourea was added to the GECO at the mixing ratios shown in the table 6, but the sulfur was not added to the GECO.

The following measurements were conducted on the characteristics of the prepared rollers and vulcanized rubber specimens composed of the polymer composition of each of the examples 11-14 and the comparison examples 13-17. The tables 5 and 6 show the results.

Experiment 3

Examples 15 through 19 of the polymer composition for the conductive roller of the third invention and comparison examples 18 through 23 will be described in detail below. Conductive foamed rollers were prepared, as described below. The mixing ratio of the components thereof are as shown in tables 7 and 8.

TABLE 7

| Mixed chemicals | | General name/compound name | Example 15 | Example 16 | Example 17 | Example 18 | Example 19 |
|---|---|---|---|---|---|---|---|
| Polymer | Epichlomer CG102 | GECO(EO:EP:AGE = 56:40:4) | 100 | 100 | 100 | 100 | 60 |
| | Neoprene WRT | CR | 0 | 0 | 0 | 0 | 40 |
| Filler | Denca black | Carbon | 2 | 2 | 2 | 2 | 2 |
| | DHT-4A-2 | Synthetic hydrotalcite | 3 | 3 | 3 | 3 | 3 |
| Assistant agent | Zinc oxide (two kinds) | Zinc white | 5 | 5 | 5 | 5 | 5 |
| | Stearic acid 4931 | Stearic acid | 1 | 1 | 1 | 1 | 1 |
| Foaming agent | Neocellbom#1000SW | 4,4'-oxybis (benzene sulfonyl hydrazide) | 7.5 | 7.5 | 7.5 | 7.5 | 7.5 |
| Vulcanizing system | Powdery sulfur | Sulfur | 0.5 | 1.0 | 1.5 | 0.5 | 0.5 |
| | Nocceler DM | Dibenzothiazolyl disulfide | 0.5 | 1.0 | 1.5 | 0.5 | 0.5 |
| | Nocceler TS | Tetramethylthiuram monosulfide | 0.17 | 0.33 | 0.5 | 0.17 | 0.17 |
| | accele 22-S | Ethylene thiourea | 1.33 | 0.67 | 1.00 | 1.33 | 1.33 |
| | Nocceler DT | di-ortho-tolylguanidine | 1.13 | 0.57 | 0.85 | 1.13 | 1.13 |
| $T_{90}$ [minute] | | | 14 | 16 | 13 | 14 | 18 |
| $T_5$ [minute]@130° C., Mooney scorch test) | | | 5 | 5 | 4 | 5 | 6 |
| Compression set | | | 12 | 11 | 13 | 13 | 15 |
| Generation of blooming | | | ○ | ○ | ○ | ○ | ○ |
| Cell diameter maximum value (μm) | | | 63 | 75 | 73 | 58 | 59 |
| Out-of-shape in vulcanization by vulcanizer | | | ○ | ○ | ○ | — | ○ |
| Surface state of vulcanized tube | | | ○ | ○ | ○ | ○ | ○ |

TABLE 8

| Mixed chemicals | | General name/compound name | Comparison Example 18 | Comparison Example 19 | Comparison Example 20 | Comparison Example 21 | Comparisom Example 22 | Comparison Example 23 |
|---|---|---|---|---|---|---|---|---|
| Polymer | Epichlomer CG102 | GECO(EO:EP:AGE = 56:40:4) | 100 | 100 | 100 | 100 | 100 | 60 |
| | Neoprene WRT | CR | 0 | 0 | 0 | 0 | 0 | 40 |
| Filler | Denca black | Carbon | 2 | 2 | 2 | 2 | 2 | 2 |
| | DHT-4A-2 | Synthetic hydrotalcite | 3 | 3 | 3 | 3 | 3 | 3 |
| Assistant agent | Zinc oxide (two kinds) | Zinc white | 5 | 5 | 5 | 5 | 5 | 5 |
| | Stearic acid 4931 | Stearic acid | 1 | 1 | 1 | 1 | 1 | 1 |
| Foaming agent | Neocellborn#1000SW | 4,4'-oxybis (benzene sulfonyl hydrazide) | 7.5 | 7.5 | 7.5 | 7.5 | 7.5 | 7.5 |
| Vulcanizing system | Powdery sulfur | Sulfur | 1.5 | | 4.0 | | 1.5 | 1.5 |
| | Nocceler DM | Dibenzothiazolyl disulfide | 1.5 | | 4.0 | | 1.5 | 1.5 |
| | Nocceler TS | Tetramethylthiuram monosulfide | 0.5 | | 2.0 | | 0.5 | 0.5 |
| | Accele 22-S | Ethylene thiourea | | 2.0 | | 6.0 | | |
| | Nocceler DT | di-ortho-tolylguanidine | | 1.7 | | 1.7 | | |
| $T_{90}$ [minute] | | | 22 | 22 | 18 | 15 | 22 | 35 |
| $T_5$ [minute]@130° C., Mooney scorch test) | | | 21 | 9 | 19 | 5 | 21 | 12 |
| Compression set | | | 10 | 8 | 16 | 7 | — | 21 |
| Generation of blooming | | | ○ | ○ | X | X | — | ○ |
| Cell diameter maximum value (μm) | | | 93 | 82 | 87 | 80 | Manufacture by using continuous vulcanization is impossible | 90 |
| Out-of-shape in vulcanization by vulcanizer | | | X | ○ | X | ○ | | ○ |
| Surface state of vulcanized tube | | | X | Δ | X | Δ | | Δ |

Examples 15 Through 19

The chemical foaming agent, the sulfur, the vulcanization accelerator, the ethylene thiourea, the zinc oxide (zinc white), and the guanidine accelerator (di-ortho-tolylguanidine) were added to the epichlorohydrin-ethylene oxide-allyl glycidyl ether copolymer (GECO) at the mixing ratios shown in table 7 in the examples 15 through 18 and added to the mixture (GECO:CR=60:40) of the GECO and CR (chloroprene) at the ratios shown in the table 7 in the example 19. Rollers composed of the polymer composition of the third invention were obtained by carrying out the below-described method. The roller of each of the examples 15 through 17 and 19 was formed by extrusion and vulcanization by using a vulcanizer. The roller of the example 18 was formed by the continuous vulcanization.

The thioureas were added to 100 g of the GECO at 0.0130 mol in the examples 15 and 18, 0.0066 mol in the example 16, 0.0098 mol in the example 17. The thioureas were added to 100 g of the mixture of the GECO+CR at 0.0130 mol in the example 19.

Comparison Examples 18 Through 23

The chemical foaming agent, the sulfur, and the vulcanizing accelerator were added to the GECO at the ratios shown in the table 8 in the comparison examples 18, 20, and 22 and added to the mixture of the GECO and the CR (GECO:CR=60:40) at the ratios shown in the table 8 in the comparison example 23. The thiourea was not added to the GECO and the mixture of the GECO and the CR. In the comparison examples 19 and 21, the thioureas were added to the GECO at the ratios shown in the table 8, but the sulfur was not added thereto. The roller of each of the comparison examples 18 through 21 and 23 was formed by extrusion and vulcanization by using a vulcanizer. The roller of the comparison example 22 was formed by the continuous vulcanization.

(Production by Extrusion and Vulcanizer)

In the examples 15 through 17 and the comparison examples 18 through 21 and 23, the components were kneaded at mixing ratios shown in tables 7 and 8 by the kneader of the enclosed type (DS10-40MWA-S, produced by Moriyama Seisakusho). The polymer composition taken out as a ribbon from the kneader was introduced into the extruder (φ60) to extrude it as a hollow tube. The rubber tube was cut to a proper size to obtain a preform.

The preform was introduced into a vulcanizer of pressurized water vapor type to vulcanize the preform at 160° C. for 10-70 minutes. Thereby a vulcanized rubber tube was obtained. At that time, the chemical foaming agent is gasified and foamed, and the crosslinking of the rubber component proceeded. A core consisting of a hot-melt adhesive agent-applied metal shaft is inserted into the hollow portion of the cylindrical conductive vulcanized foamed tube to heat it and bond the core metal and the tube to each other. After the surface of the tube was polished, the tube was cut to a predetermined size to obtain the conductive roller having a shaft diameter of φ6 mm, a roll outer diameter of φ12 mm, and a roll length of 220 mm. The vulcanizing condition was appropriately adjusted with reference to the $t_{90}$ (minute) of the cure meter so that the preform was vulcanized sufficiently.

(Production by Continuous Vulcanization)

In the example 18 and the comparison example 22, components were kneaded at mixing ratios shown in tables 7 and 8. Thereafter the mixture was continuously extruded as a hollow tube from the extruder. The hollow tube was vulcanized with a continuous vulcanizing apparatus to obtain a vulcanized rubber tube. Then a conductive foamed roller was obtained in the same manner as that described above.

More specifically, the polymer composition taken out as a ribbon from the kneader was introduced into an extruder of an extrusion-continuous vulcanization line. The extruded polymer composition was vulcanized with a microwave (UHF) to progress the vulcanization. Then hot-air vulcanization (HAV) was carried out. The UHF was performed at 5.0 m/minute and 3.5 kW. The temperature of a material surface at an exit was set to 130° C.-150° C. In the HAV, the vulcanization was conducted by hot air of 210° C., and the temperature of the surface of the tube was set to 170° C.-180° C. The total of the HAV zones was 30 m. At a continuous vulcanization time, the tube was slightly twisted in the space between zones with a guide roll to rotate it more than 180 degrees.

The following measurements were conducted on the characteristics of the prepared conductive roller composed of the polymer composition of each of the examples and the comparison examples. The tables 7 and 8 show the results.

Experiment 4

Examples 20 through 22 of the polymer composition for the conductive roller of the fourth invention and comparison examples 24 through 28 will be described in detail below. Conductive foamed rollers were prepared, as described below. The mixing ratio of the components are as shown in tables 9 and 10.

TABLE 9

| | Mixed chemicals | General name/compound name | Example 20 | Example 21 | Example 22 |
|---|---|---|---|---|---|
| Polymer | Epichlomer CG102 | GECO(EO:EP:AGE = 56:40:4) | 100 | 100 | 80 |
| | neoprene WRT | CR | | | 20 |
| Filler | Denca black | Carbon | 2 | 2 | 2 |
| | Magusarratto 150ST | Magnesium oxide | 3 | 3 | 3 |
| | DHT-4A-2 | Synthetic hydrotalcite | | | |
| Assistant agent | Zinc oxide (two kinds) | Zinc white | 5 | 5 | 5 |
| | Stearic acid 4931 | Stearic acid | 1 | 1 | 1 |
| Foaming agent | Neocell born # 1000 SW | 4,4'-oxybis (benzene sulfonyl hydrazide) | 7.5 | 7.5 | 7.5 |
| Vulcanizing system | Powdery sulfur | Sulfur | 1.0 | 1.0 | 1.0 |
| | Nocceler DM | Dibenzothiazolyl disulfide | 1.0 | 1.0 | 1.0 |
| | Nocceler TS | Tetramethylthiuram monosulfide | 0.88 | 0.88 | 0.88 |
| | Actor BSH | 2-di-n-butylamino-4,6-dimelcapto-S-triazine | 1.06 | 1.06 | 1.06 |
| | Nocceler DT | di-ortho-tolylguanidine | | | |
| $T_{90}$ [minute] | | | 16 | 16 | 18 |
| $T_5$ [minute]@130° C., Mooney scorch test) | | | 5 | 5 | 2 |
| Compression set | | | 11 | 13 | 15 |
| Generation of blooming | | | ○ | ○ | ○ |
| Cell diameter maximum value (μm) | | | 61 | 57 | 60 |
| Out-of-shape in vulcanization by vulcanizer | | | ○ | — | ○ |
| Surface state of vulcanized tube | | | ○ | ○ | ○ |

TABLE 10

| | Mixed chemicals | General name/compound name | Comparison Example 24 | Comparison Example 25 | Comparison Example 26 | Comparison Example 27 | Comparison Example 28 |
|---|---|---|---|---|---|---|---|
| Polymer | Epichlomer CG102 | GECO(EO:EP:AGE = 56:40:4) | 100 | 100 | 100 | 100 | 100 |
| | Neoprene WRT | CR | 0 | 0 | 0 | 0 | 20 |
| Filler | Denca black | Carbon | 2 | 2 | 2 | 2 | 2 |
| | Magusarratto 150ST | Magnesium oxide | | | 3 | | |
| | DHT-4A-2 | Synthetic hydrotalcite | 3 | 3 | | 3 | 3 |
| Assistant agent | Zinc oxide (two kinds) | Zinc white | 5 | 5 | 5 | 5 | 5 |
| | Stearic acid 4931 | Stearic acid | 1 | 1 | 1 | 1 | 1 |
| Foaming agent | Neocellborn#1000SW | 4,4'-oxybis (benzene sulfonyl hydrazide) | 7.5 | 7.5 | 7.5 | 7.5 | 7.5 |
| Vulcanizing system | Powdery sulfur | Sulfur | 1.5 | | | 1.5 | 1.5 |
| | Nocceler DM | Dibenzothiazolyl disulfide | 1.5 | | | 1.5 | 1.5 |

TABLE 10-continued

| Mixed chemicals | General name/compound name | Comparison Example 24 | Comparison Example 25 | Comparison Example 26 | Comparison Example 27 | Comparison Example 28 |
|---|---|---|---|---|---|---|
| Nocceler TS | Tetramethylthiuram monosulfide | 0.5 | | 1.65 | 0.5 | 0.5 |
| accele 22-S | Ethylene thiourea | | 2.0 | | | |
| Actor BSH | 2-di-n-butylamino-4,6-dimelcapto-S-triazine | | | 3.18 | | |
| Nocceler DT | di-ortho-tolylguanidine | | 1.7 | | | |
| $T_{90}$ [minute] | | 22 | 22 | 36 | 22 | 14 |
| $T_5$ [minute]@130° C., Mooney scorch test) | | 21 | 9 | 3 | 21 | 23 |
| Compression set | | 10 | 6 | 7 | — | 31 |
| Generation of blooming | | ○ | ○ | X | — | ○ |
| Cell diameter maximum value (μm) | | 93 | 82 | 85 | Manufacture by using continuous vulcanization is impossible | 81 |
| Out-of-shape in vulcanization by vulcanizer | | X | ○ | X | | ○ |
| Surface state of vulcanized tube | | X | Δ | X | | Δ |

Experiment 20 Through 22

The chemical foaming agent, the sulfur, the 2-di-n-butylamino-4,6-dimelcapto-S-triazine, the vulcanization accelerator, the zinc Oxide (zinc white), and the magnesium oxide, and the fillers were added to the epichlorohydrin-ethylene oxide-allyl glycidyl ether copolymer (GECO) at the mixing ratios shown in table 9 in the examples 20 and 21 and added to the mixture (GECO:CR=80:20) of the GECO and the CR (chloroprene) at the ratios shown in the table 9 in the example 22. Rollers composed of the polymer composition of the fourth invention were obtained by carrying out a method similar to that of the experiment 3. The roller of each of the examples 20 and 22 was formed by extrusion and vulcanization by using the vulcanizer. The roller of the example 21 was formed by the continuous vulcanization.

The triazine and/or its derivative were added to 100 g of the GECO at 0.0039 mol in the examples 20 and 21 and to 100 g of the mixture of the GECO+the CR at 0.0039 mol in the example 22.

Comparison Examples 24 Through 28

The chemical foaming agent, the sulfur, and the vulcanizing accelerator were added to the GECO at the ratios shown in the table 10 in the comparison examples 24, 25, and 27 and added to the mixture of the GECO and the CR (GECO:CR=80:20) at the ratios shown in the table 10 in the comparison example 28. The triazine and/or its derivative were not added to the GECO and the mixture of the GECO and the CR. In the comparison example 26, the triazine and/or its derivative were added to the GECO at the ratio shown in the table 10, but the sulfur was not added thereto. The roller of each of the comparison examples 24, 25, 26, and 28 was formed by extrusion and vulcanization by using the vulcanizer. The roller of the example 27 was formed by the continuous vulcanization.

The following measurements were conducted on the characteristics of the prepared conductive roller composed of the polymer composition of each of the examples 20-22 and the comparison examples 24-28. The tables 9 and 10 show the results.

(Measurement of Volume Resistivity Value)

The vulcanized rubber slab sheets (130 mm×130 mm×2 mm) were prepared to measure the volume resistivity (volume resistivity value) ρV [Ω·cm] described in JIS K6911 at an applied voltage of 1000V under a constant temperature of 23° C. and a constant relative humidity of 55% with a digital ultra-high resistance micro-ammeter R-8340A manufactured by Advance Test Corporation Inc.

Each table shows the volume resistivity value by common logarithm.

(Measurement of Compression Set)

In accordance with the description of JIS K6262 "method of testing compression set of vulcanized rubber", the compression set was measured at 70° C. for 22-24 hours.

The compression rate was 25% of the thickness of the specimen.

(Test for Examining Stain of Photosensitive Member)

The vulcanized rubber slab sheets of the examples and the comparison examples were stored for a week at 32.5° C. at a relative humidity of 90%, with the vulcanized rubber slab sheets pressed against a photosensitive member set in a cartridge (cartridge type:C 4127x) of a laser beam printer of Laser Jet 4000 type produced by Hulet Packard Inc. After each vulcanized rubber slab sheet was removed from the photosensitive member, a half-tone printing was carried out by the printer accommodating the photosensitive member. Whether or not printed sheets of paper were stained was visually checked, and evaluation was made at the following four criteria:

○: Printed paper was not stained when they were seen with the eye.

$Δ^+$: Very low degree of stain (when five or less sheets of paper were printed, stain was hardly visible and thus no problem in use)

$Δ^-$: Low degree of stain (when five to ten or less sheets of paper were printed, stain was hardly visible)

x: High degree of stain (when 11 or more sheets of paper were printed, stain could be recognized with the eye)

(Measurement of Peripheral Nonuniformity of Electric Resistance of Roller)

Figure 3:
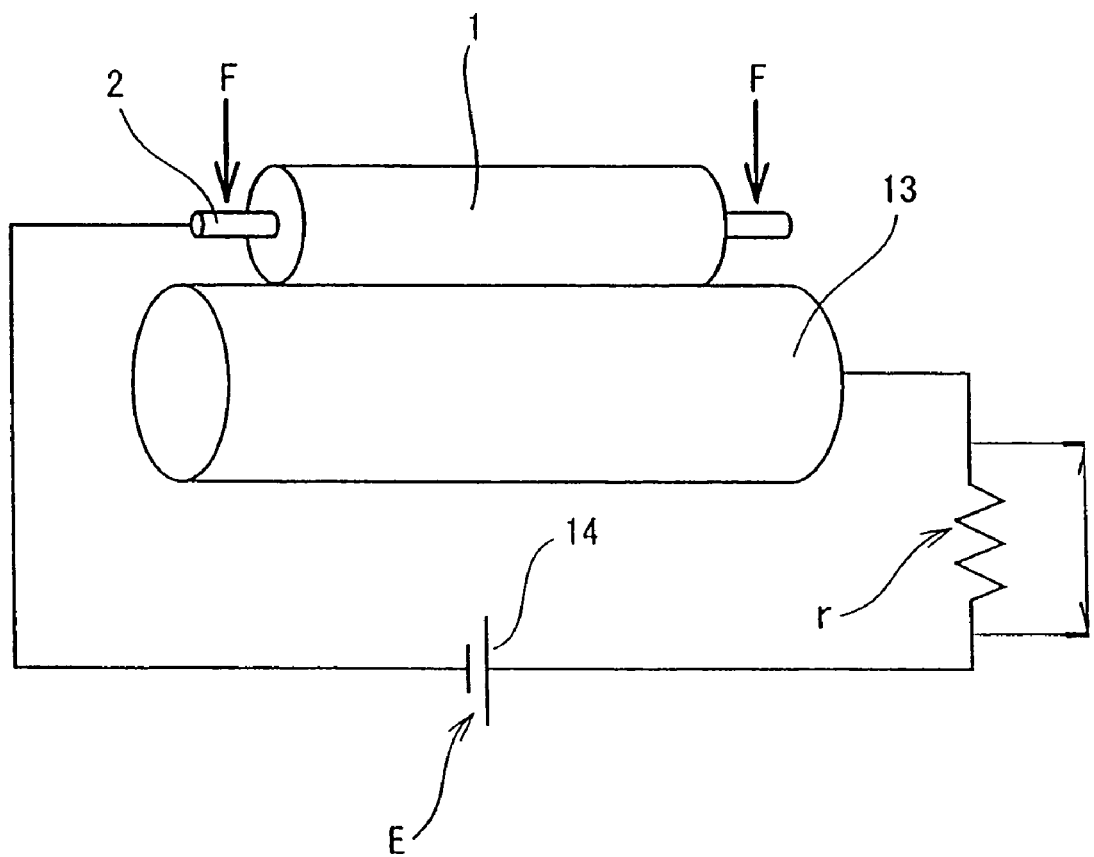
FIG. 3 is an explanatory view showing a method of measuring a peripheral nonuniformity of the electric resistance of the conductive roller.

As shown in FIG. 3, to measure the peripheral nonuniformity of the electric resistance of each roller, a conductive roller 1 through which a core metal 2 had been inserted was mounted on an aluminum drum 13, with the conductive roller 1 in contact with the aluminum drum 13. One leading end of a lead wire having an internal resistance r (100Ω) was connected with the positive (+) side of a power source 14, whereas the other end thereof was connected with one end surface of the aluminum drum 13. One end of a lead wire connected with the negative (−) side of the power source 14 is connected with one end surface of the conductive roller 1.

A voltage applied to the internal resistance r of the lead wire was detected. The detected voltage was denoted by V.

Supposing that a voltage applied to this apparatus is E, the resistance R of the conductive roller is expressed as R=r×E/(V−r). In this measurement, −r is regarded as being minute. Thus R=r×E/V.

With a load F of 500 g applied to both ends of the core metal 2 and the conductive roller 1 rotating 30 rpm, the applied voltage E was set to 500V. The detected voltage V was measured 100 times in four seconds. The resistance R was computed by using the above equation. The ratio of a maximum resistance value to a minimum resistance value was set as the peripheral nonuniformity. The measurement was conducted under a constant temperature of 23° C. and a constant relative humidity of 55%.

(Evaluation of Vulcanization Time Period)

After an optimum amount of the unvulcanized polymer composition of each of the examples and the comparison examples was sampled, vulcanization curves were measured by a cure meter of V-type VDR produced by Nichigo Shoji Kabushiki Kaisha. In accordance with "die vulcanization test method A" of "vulcanization test by vibration-type vulcanization tester" of JIS standard, a sine wave vibration of low amplitude (1° in the present invention) was applied to the rubber specimen in such a way as not to destroy the rubber specimen. A torque transmitted to an upper die from each specimen was measured from an unvulcanized state to an over-vulcanized state. Data of $t_c(90)$(90% torque rise point: $t_{90}$)[minute] serving as the index of an optimum vulcanization time period was computed to compare the results with one another.

Figure 4:
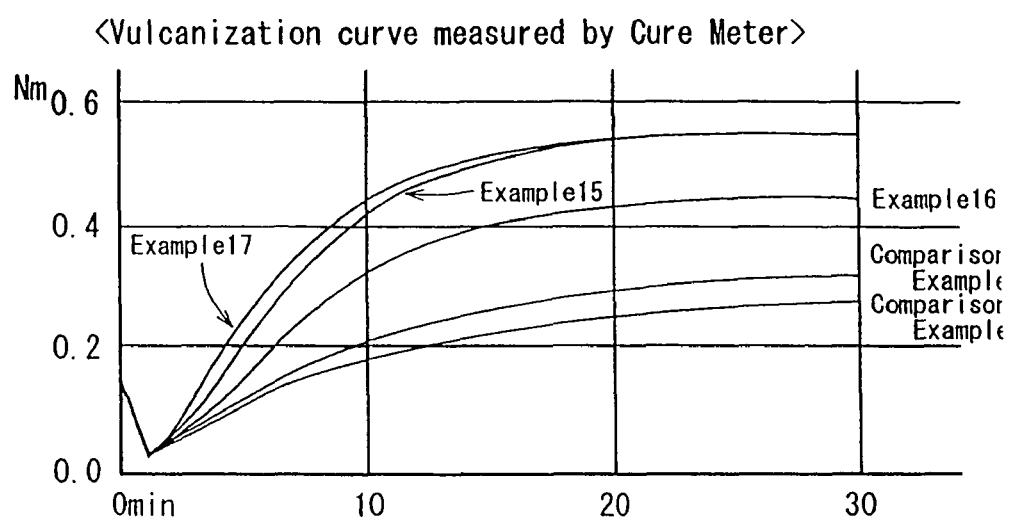
FIG. 4 shows a vulcanization curve of examples 15-17 and comparison examples 18 and 19 measured by a cure meter.
Figure 5:
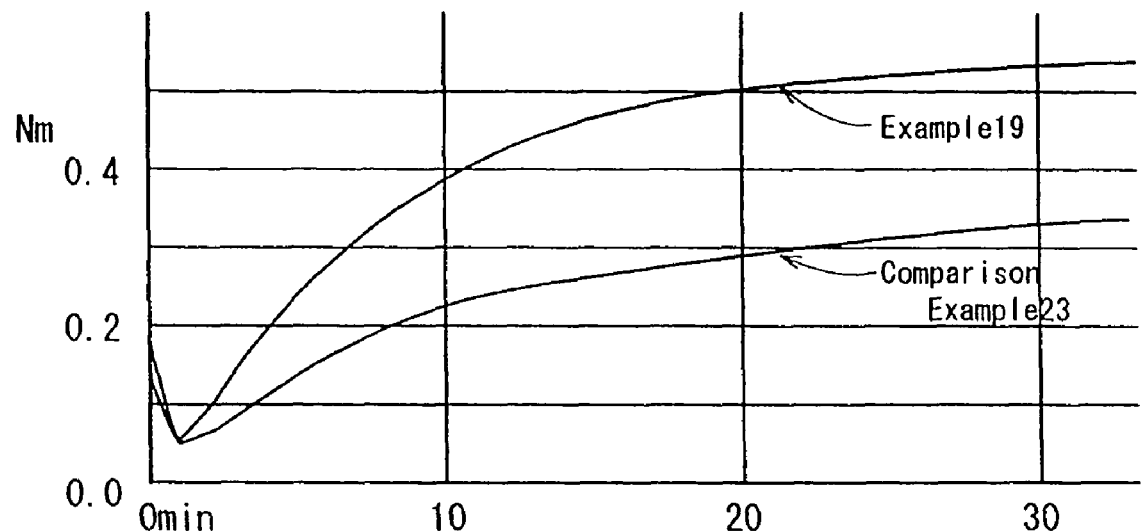
FIG. 5 shows a vulcanization curve of an example 19 and a comparison example 23 measured by the cure meter.

FIGS. 4 and 5 show the vulcanization curves obtained in the experiment 3. FIGS. 4 and 5 indicate that owing to the third invention, the crosslinking efficiency rose conspicuously above a normally expected region (torque or crosslinking speed intermediate between comparison examples 18 and 19) and the crosslinking speed was accelerated.

Figure 6:
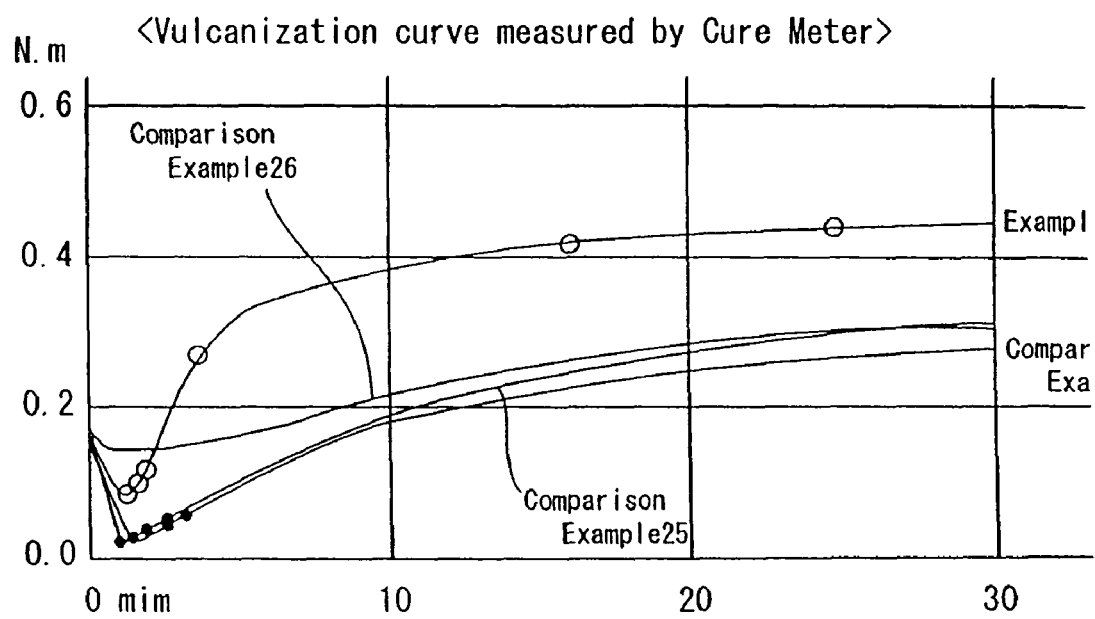
FIG. 6 shows a vulcanization curve of an example 20 and comparison examples 24, 25, and 26 measured by the cure meter.
Figure 7:
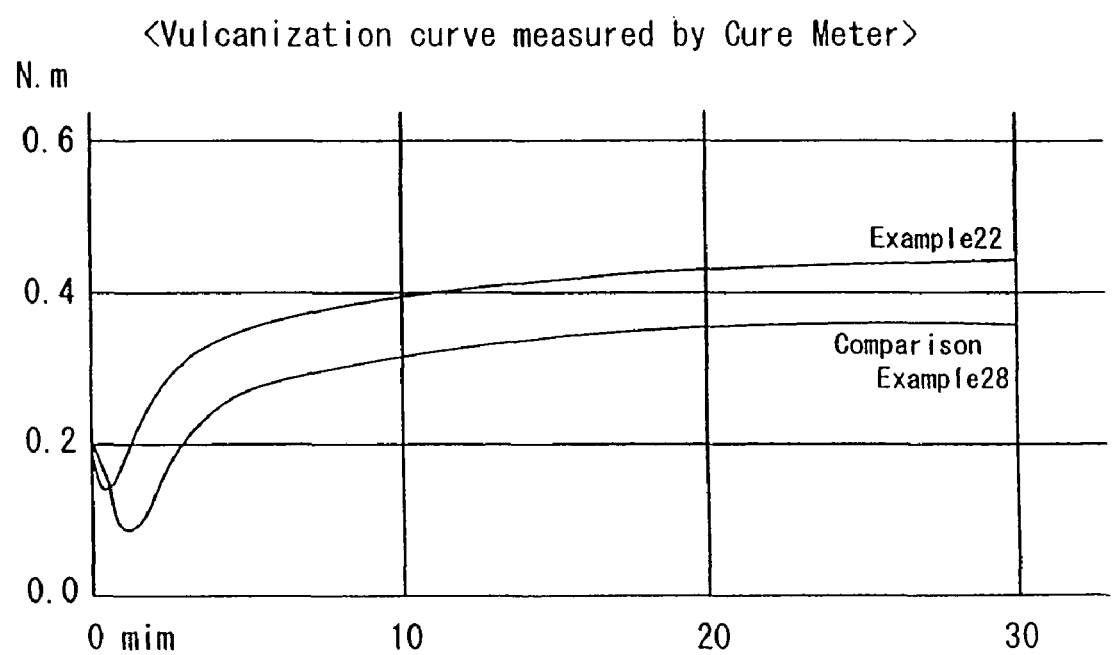
FIG. 7 shows a vulcanization curve of an example 22 and a comparison example 28 measured by the cure meter.

FIGS. 6 and 7 show the vulcanization curves obtained in the experiment 4. FIGS. 6 and 7 indicate that owing to the fourth invention, the crosslinking efficiency rose conspicuously above a normally expected region (torque or crosslinking speed intermediate between comparison examples 24 and 26) and the crosslinking speed was accelerated.

(Evaluation of Blooming)

After the roller of each of the examples and the comparison examples was left for one month at a temperature of 23° C. and a relative humidity of 55%, whether blooming occurred on the surface of each roller was visually checked. Evaluation was made in the following manner:

○: Blooming did not occur.
x: Blooming occurred.

(Mooney Scorch Test)

A test were conducted in accordance with the description of the Mooney scorch test of the physical test method of unvulcanized rubber described in JIS K6300. The measurement of scorch $t_5$ was conducted at 130.0° C.±0.5° C.

(Measurement of Diameter of Cell)

The section of the roller of each of the examples and the comparison examples was photographed at a magnification (×100) to examine the maximum diameter and minimum diameter of cells. The maximum diameter (μm) is shown.

(Out-of-Shape Degree of Tube Formed by Vulcanizer and Surface State of Tube)

Each foamed tube prepared by the extrusion and the vulcanization by using the vulcanizer was cut to a length of 270 mm and then the cut tubes were vulcanized. Cut tubes which hung down at both ends thereof and cannot be put into practical use were unacceptable and rated as (x), whereas those which did not have such a defect and can be mass-produced were good and rated as ○.

In checking the surface state of each tube formed by extrusion and vulcanization by using the vulcanizer, the inner surface thereof was examined carefully. Tubes whose inner surfaces were so rough that the shaft could not be inserted thereinto manually were unacceptable and rated as (x). Tubes which made it difficult to insert the shaft thereinto by an automatic insertion device but allowed a manual insertion and allowed a roller to be formed somehow were rated as Δ. Tubes which had a favorable inner surface and allowed the shaft to be inserted thereinto by the automatic insertion device were acceptable and rated as (○).

Even tubes rated as x were formed into a conductive roller respectively by utilizing a tube receiver in a vulcanization time and by vulcanizing them cut longer than 270 mm. Evaluation was also made on those tubes.

As indicated in the tables 1 and 2, the specimens composed of the conductive polymer compositions of the examples 1 through 10 had low volume resistivity values in the range of $10^{7.04}$ [Ω·cm] to $10^{7.50}$ [Ω·cm] and low compression set in the range of 5.9% to 10.0%. In the evaluation of the test for examining the stain of the photosensitive member, the specimens of the examples 1, 2, 3, 5, 8, and 10 were rated as ○, and the specimens of the examples 4, 6, 7, and 9 were good and rated as $Δ^+$. The peripheral nonuniformity of the electric resistance of the roller of the examples 1 through 10 had small values in the range of 1.05 to 1.15.

As described above, the specimen of each of the examples 1 through 10 had a low volume resistivity value and compression set and hardly stained the photosensitive member. The peripheral nonuniformity of the electric resistance of the roller, namely, the variation of the electric resistance thereof was small. Thus they can be used without any problems.

On the other hand, as shown in the tables 3 and 4, the specimen of each of the comparison examples 1 and 2 had a high compression set. The specimen of the comparison example 2 stained the photosensitive member much. The specimen of the comparison example 3 had a high volume resistivity value and was thus unsuitable as the conductive roller. The specimen of the comparison example 4 had a high volume resistivity value and compression set and stained the photosensitive member much.

The specimen of each of the comparison examples 5 through 8 contained the epichlorohydrin rubber containing ethylene oxide at less than 55 mol %. Thus the specimen of the comparison example 5 had a high volume resistivity value. The specimen of the comparison example 6 had also a high volume resistivity value and stained the photosensitive member much. The specimen of the comparison example 7 had also a high volume resistivity value and compression set and stained the photosensitive member much. The specimen of the comparison example 8 had a high degree of nonuniformity in the resistance of the roller. As such, the specimens of the comparison examples 5 through 8 were all unsuitable as the conductive roller.

The specimen of each of the comparison examples 9 and 10 had a high volume resistivity value. The specimen of the comparison example 11 had a high volume resistivity value and stained the photosensitive member much. The specimen of the comparison example 12 had also a high volume resistivity value and stained the photosensitive member much. Thus the specimen of the comparison examples 9 through 12 were all unsuitable as the conductive roller.

As the table 5 indicates, the specimen of each of the examples 11 through 14 was composed of the polymer composition of the second invention. More specifically, they contained the GECO or the mixture of the GECO and the CR, the sulfur, and the ethylene thiourea or the master batch of the ethylene thiourea. These components were mixed with one another at the ratios shown in the table 5. In $t_{90}$ serving as the index of the vulcanization speed, the polymer composition of each of the examples 11 through 14 had 17 to 22 minutes which were less than 30 minutes. Thus the vulcanization time period was proper. The compression set of the specimen of each of the examples 11 through 14 was in the range of 10% to 18% which was less than 20%. Thus the compression set were proper. Blooming did not occur.

As shown in the table 6, since the specimen of each of the comparison examples 13, 14, and 17 did not contain the thiourea as the vulcanizing system in that contained only sulfur as vulcanizer, the compression set thereof were more than 20% and thus unsuitable. The specimen of the comparison example 13 generated blooming.

Because the specimen of the comparison example 15 contained the thioureas and the guanidine accelerator but did not contain the sulfur, $t_{90}$ serving as the index of the vulcanization speed was more than 30 minutes. Thus the vulcanization speed was slow. Therefore the specimen of the comparison example 15 was unsuitable as the conductive roller.

The specimen of the comparison example 16 also contained the guanidine accelerator and the thioureas whose amount was larger than that of the specimen of the comparison example 15. Thus the vulcanization speed was higher than that in the comparison example 15. However, the specimen of the comparison example 16 generated blooming.

The chemical foaming agent, the sulfur, and the ethylene thiourea were added to the GECO at the mixing ratios shown in table 7 in the examples 15 through 18 and added to the mixture of the GECO and the CR at the ratios shown in the table 7 in the example 19. Therefore the $t_{90}$ was in the range of 13 minutes to 18 minutes. The vulcanization speed was appropriate. The compression set thereof were in the range of 11% to 15% and thus proper. Blooming did not occur. The maximum cell diameter was very small. The surface state of the vulcanized tube was preferable. The scorch time was appropriately short.

The specimen of each of the examples 15, 16, 17, and 19 formed by using the vulcanizer did not get out of shape and was good. The specimen of the example 18 formed by the continuous vulcanization was comparative short in the scorch time $t_5$. That is, the favorable product could be formed by the continuous vulcanization.

As shown in the table 8, the specimen of each of the comparison examples 18, 20, and 23 did not contain the thiourea as the vulcanizing system in that contained only sulfur as vulcanizer. Therefore inhibition of vulcanization occurred and the tubes got out of shape or the surfaces thereof were rough. The cell diameter was a little large, and the scorch time was long. The specimen of the comparison example 20 bloomed. In the comparison example 23, the vulcanization time period was required to be long and the compression set was high.

The specimen of the comparison example 19 contained the thioureas and the guanidine accelerator but did not contain the sulfur. Thus the specimen had a large $t_{90}$ serving as the index of the vulcanization speed, and thus the vulcanization speed was slow. The surface of the vulcanized tube was rough. Therefore the specimen of the comparison example 19 was unsuitable as the conductive roller.

The specimen of the comparison example 21 also contained the guanidine accelerator and the thioureas whose amount was larger than that of the specimen of the comparison example 19. Thus the vulcanization speed was higher than that in the comparison example 19. However, the specimen of the comparison example 21 generated blooming. The surface of the vulcanized tube was rough.

In the comparison example 22, production by means of the continuous vulcanization was tried. The scorch time $t_5$ took as long as 21 minutes. The production by means of the continuous vulcanization could not be accomplished.

As shown in the table 9, the chemical foaming agent, the sulfur, and the 2-di-n-butylamino-4,6-dimelcapto-S-triazine were added to the GECO at the mixing ratios shown in table 9 in the examples 20 and 21 and added to the mixture of the GECO and the CR at the ratio shown in the table 9 in the example 22. Therefore $t_{90}$ was in the range of 16 minutes to 18 minutes. The vulcanization speed was appropriate. The compression set was in the range of 11% to 15% and thus proper. Blooming did not occur. The maximum cell diameter was very small. The surface state of the vulcanized tube was preferable. The scorch time was appropriately short.

The specimen of each of the examples 20 and 22 formed by using the vulcanizer did not get out of shape and was good. The specimen of the example 21 formed by performing the continuous vulcanization was short in the scorch time $t_5$. That is, the favorable product could be formed by performing the continuous vulcanization.

As shown in the table 10, because the specimen of the comparison example 24 did not contain the triazine and/or its derivative as the vulcanizing system, in that contained only sulfur as vulcanizer inhibition of vulcanization occurred, the tube got out of shape, and the surface thereof was rough. Thus mass-production was impossible. The cell diameter was a little large. The vulcanization time period and the scorch time period were long.

The specimen of the comparison example 25 contained the thioureas and the guanidine accelerator but did not contain the sulfur. Thus the specimen had a large $t_{90}$ serving as the index of the vulcanization speed, and thus the vulcanization speed was slow. The surface of the vulcanized tube was rough. Therefore the specimen of the comparison example 25 was unsuitable as the conductive roller.

The specimen of the comparison example 26 contained the triazine and/or its derivative but did not contain the sulfur as the vulcanizing system. Thus inhibition of vulcanization occurred and the tube got out of shape during the vulcanizing operation. Further the surface of the vulcanized tube was rough. In addition, blooming occurred.

In the comparison example 27, production by means of the continuous vulcanization was tried. Since the specimen of the comparison example 27 did not contain the triazine and/or its derivative, the scorch time $t_5$ took as long as 21 minutes. Therefore the tube was deformed when it was transported by a conveyer or a roller. The production could not be accomplished by the continuous vulcanization.

The specimen of the comparison example 28 did not contain the triazine and/or its derivative, in that contained only sulfur as vulcanizer. Therefore the specimen had a high compression set. The surface state of the vulcanized tube was unfavorable.

As apparent from the foregoing description, according to the first invention, the conductive polymer composition contains the rubber component whose main component is the epichlorohydrin rubber in which the content of the ethylene oxide is specified. The conductive polymer composition also contains the thioureas, serving as the crosslinking agent, whose content is specified in dependence on necessity to specify the value of the compression set and the volume resistivity value. Therefore the polymer composition hardly bleeds and stains the photosensitive member. Further it is possible to reduce the volume resistivity value and the compression set in such a way that the volume resistivity value and the compression set are optimum for the conductive roller.

By not adding a lead compound to the rubber component and adding the thioureas thereto as the master batch, it is possible to take consideration for an operator and environment.

The conductive roller has a low volume resistivity value, a low compression set, and hardly stains a photosensitive member. Further it is possible to make the variation of the electric resistance value small. Therefore the conductive roller composed of the polymer composition of the first invention can be preferably used as conductive rollers such as a developing roller, a charging roller, and a transfer roller for a color copying machine and a color printer.

According to the second invention, the polymer composition contains the specific polymer having the carbon-to-carbon double bond and the halogen and the crosslinking system composed of the combination of the sulfur and the thioureas. Therefore it is possible to obtain the polymer composition which can be vulcanized at a high speed and which has a low compression set. In addition, it is possible to increase the crosslinking density and the vulcanization speed without generating blooming and staining the photosensitive member. Furthermore by using the sulfur and the thioureas in combination, it is also possible to suppress a thermal deformation which will occur when the crosslinking system consists of the sulfur. Moreover conductive rollers and belts can be produced by the continuous vulcanization. Thus it is possible to reduce the cost for manufacturing the roller and the like.

By using the epichlorohydrin polymer such as the epichlorohydrin-ethylene oxide-allyl glycidyl ether copolymer as the specific polymer, it is possible to reduce the electric resistance, prevent generation of blooming, and suppress stain of the photosensitive member.

The polymer composition can be vulcanized at an appropriately high speed, has high productivity, has a low compression set, and excellent in utility such as durability, dimensional stability, and the like. Therefore the conductive roller and belts composed of the polymer composition of the second invention can be preferably used as conductive rubber rollers and belts suitable for use in a developing roller, a charging roller, and a transfer roller for a color copying machine and a color printer.

According to the third invention, the polymer composition contains the specific polymer having the carbon-to-carbon double bond (C=C) and the halogen as its main component, the chemical foaming agent, the sulfur, and the thioureas. Therefore it is possible to reduce inhibition of vulcanization which has been hitherto caused by the chemical foaming agent. Thereby it is possible to realize a very fast vulcanization speed and efficiency equal to that which can be obtained in a vulcanizing system consisting of the sulfur without chemical foaming agent. Thereby it is possible to obtain a preferable foamed state and increase a nip width.

Further the vulcanization system of the thioureas realizes a low compression set, and the vulcanization system of the sulfur increases the vulcanization speed. While suppressing the stain of the photosensitive member and generation of blooming, it is possible to realize efficient reduction of the electric resistance value and that of the compression set as well as improvement of the vulcanization speed.

Further the surface of a vulcanized tube is preferable. Furthermore it is possible to prevent the vulcanized tube from getting out of shape when it is produced by a vulcanizer and a defective production caused thereby. Therefore it is possible to improve productivity. In addition, it is possible to make diameters of cells uniform and very small. Thus the conductive roller of the third invention has a high strength and a very favorable foamed shape.

In the third invention, the vulcanizing system consists of the combination of the sulfur and the thiourea. Thus the vulcanizing system of the third invention makes a scorching time much shorter than a vulcanizing system consisting of a single vulcanizing agent. In particular, the vulcanizing system of the third invention allows production of the conductive roller by the continuous vulcanization of a foam composed of the epichlorohydrin polymer. The continuous vulcanization eliminates loss of rubber, reduces a time required for production, and the labor cost. Thus it is possible to reduce the manufacturing cost and in addition makes the diameter of cells small.

Accordingly in the present situation where outstanding progress is made in forming a high-quality image by digital image processing technique and color image processing technique, it is possible to manufacture high-quality conductive rollers such as a developing roller, a charging roller, a transfer roller for a color copying machine or a color printer.

The fourth invention has effects similar to those of the third invention. The polymer composition of the fourth invention is superior because triazine and its derivative are kind and safe to environment unlike ordinary vulcanizing accelerators, can be handled easily, is superior in workability, and give less burden to an operator. Further because it is unnecessary to use a master batch or the like, the fourth invention is excellent in workability and productivity. By-products hardly result from the triazine and/or its derivative in a vulcanization time. Thus it is possible to reduce the degree of stain of the photosensitive member.

The invention claimed is:

1. A polymer composition for a conductive roller, comprising:
   a rubber component having chloroprene rubber and an epichlorohydrin rubber comprising epichlorohydrin-ethylene oxide copolymer containing ethylene oxide at not less than 55 mol % nor more than 95 mol %,
   wherein in a compression set test of a vulcanized rubber described in JIS K6262, a compression set measured at 70° C. for 22-24 hours is less than 15%; and in a volume resistivity value test described in JIS K6911, a volume resistivity value measured at an applied voltage of 1000V is less than $10^{7.5}$ [Ω·cm], and
   wherein said polymer composition comprises thioureas as a master batch, said master batch of the thioureas comprises acrylic resin serving as a binder, and
   wherein said thioureas are added to 100 g of said rubber component as a crosslinking agent at a rate not less than 0.014 mol nor more than 0.080 mol, wherein the weight ratio between the thioureas and the binder is in a range of 90:10 to 60:40,
   wherein the polymer composition does not contain a lead compound,
   wherein zinc oxide as an assistant crosslinking agent is added to 100 parts by weight of said rubber component at not less than 0.1 parts by weight nor more than 20.0 parts by weight, and
   wherein hydrotalcite is added to 100 parts by weight of said rubber component at not less than 0.5 parts by weight nor more than 15 parts by weight.

* * * * *